(12) United States Patent
Kaltenbach et al.

(10) Patent No.: US 8,936,529 B2
(45) Date of Patent: Jan. 20, 2015

(54) RATIO STEP OF A STEPPED TRANSMISSION, AND STEPPED TRANSMISSION

(71) Applicant: ZF Friedrichshafen AG, Friedrichshafen (DE)

(72) Inventors: Johannes Kaltenbach, Friedrichshafen (DE); Eckhardt Luebke, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/953,774

(22) Filed: Jul. 30, 2013

(65) Prior Publication Data
US 2014/0038769 A1 Feb. 6, 2014

(30) Foreign Application Priority Data
Aug. 2, 2012 (DE) .......................... 10 2012 213 667

(51) Int. Cl.
*F16H 3/44* (2006.01)
*F16H 37/04* (2006.01)
(Continued)

(52) U.S. Cl.
CPC ............ *F16H 37/042* (2013.01); *F16H 37/046* (2013.01); *F16H 3/006* (2013.01);
(Continued)

(58) Field of Classification Search
CPC . F16H 3/093; F16H 2003/445; F16H 37/042; F16H 37/046; F16H 2037/047; F16H 2037/048; F16H 2200/2007

USPC ................. 475/271, 286, 302, 303, 331, 345; 74/331
See application file for complete search history.

(56) References Cited

U.S. PATENT DOCUMENTS

| 5,628,703 A * | 5/1997 | Roeper ......................... 475/159 |
| 7,077,024 B2 * | 7/2006 | Lauri et al. ...................... 74/325 |

(Continued)

FOREIGN PATENT DOCUMENTS

| DE | 44 22 900 A1 | 11/1994 |
| DE | 102008002296 A1 | 12/2009 |
| DE | 102008002750 A1 | 12/2009 |

OTHER PUBLICATIONS

German Search Report issued in corresponding German Application No. 10 2012 213 667.3 mailed on Jul. 11, 2013.

*Primary Examiner* — Michael Mansen
*Assistant Examiner* — Tinh Dang
(74) *Attorney, Agent, or Firm* — Davis & Bujold, PLLC; Michael J. Bujold

(57) ABSTRACT

A transmission ratio step of a stepped transmission which can couple at least two parallel transmission shafts. Multiple transmission ratios can be implemented with the ratio steps. A planetary gear set, comprising three components, is located coaxial with a first shaft. A first component is connected to and driven by an input supplied along the first axis, and a second component meshes with at least one spur gear, each of which is placed on a further axis that is parallel to the first axis. A first transmission ratio can be engaged by fixing a third component of the planetary gear set, and a second transmission ratio can be implemented by connecting either the third or the second transmission component to the drive supplied along the first axis. At least one the transmission ratio steps is utilized in a stepped transmission of a motor vehicle transmission.

17 Claims, 20 Drawing Sheets

(51) Int. Cl.
   *F16H 3/00* (2006.01)
   *F16H 37/08* (2006.01)
   *F16H 3/095* (2006.01)

(52) U.S. Cl.
   CPC ............ F16H37/0833 (2013.01); F16H 3/095 (2013.01); *F16H 2200/0069* (2013.01); *F16H 2200/0073* (2013.01); *F16H 2200/0086* (2013.01); *F16H 2200/0091* (2013.01); *F16H 2200/0078* (2013.01)

USPC ........... 475/286; 475/271; 475/302; 475/343; 475/331; 74/331

(56) References Cited

U.S. PATENT DOCUMENTS

| | | | |
|---|---|---|---|
| 7,311,630 B2 * | 12/2007 | Borgerson | 475/215 |
| 7,604,561 B2 * | 10/2009 | Earhart | 475/218 |
| 2009/0325763 A1 | 12/2009 | Dittrich et al. | |
| 2011/0072923 A1 | 3/2011 | Dittrich et al. | |

* cited by examiner

| GEAR | S1/S3 | S4/S5 | S6 | S2 | S7/S8 |
|------|-------|-------|----|----|-------|
| 1 | S1 | | S6 | | S7 |
| 2 | S3 | S5 | | | S7 |
| 3 | S1 | S4 | S6 | | S7 |
| 4 | S3 | S5 | | | S7 |
| 5 | S1 | S4 | S6 | | S7 |
| 6 | S3 | S5 | | | S7 |
| 7 | S1 | S4 | S6 | | S8 |
| 8 | S3 | S5 | | | S8 |
| 9 | S1 | S4 | S6 | | S8 |
| 10 | S3 | S5 | | | S8 |
| 11 | S1 | S4 | S6 | | S8 |
| 12 | S3 | | | | S8 |
| R1 | | S5 | S6 | S2 | S7 |
| R2 | | S5 | | S2 | S7 |
| R3 | | S4 | | S2 | S7 |

Fig. 3

| GEAR | S1/S2 | S6/S3 | S4/S5 | S7/S8 |
|---|---|---|---|---|
| 1 |  | S6 | S5 | S7 |
| 2 | S1 |  | S5 | S7 |
| 3 |  | S3 | S5 | S7 |
| 4 | S1 | S6 | S4 | S7 |
| 5 |  |  | S4 | S7 |
| 6 | S1 | S3 | S4 | S7 |
| 7 |  | S6 | S5 | S8 |
| 8 | S1 |  | S5 | S8 |
| 9 |  | S3 | S5 | S8 |
| 10 |  | S6 | S4 | S8 |
| 11 |  |  | S4 | S8 |
| 12 |  | S3 | S4 | S8 |
| R1 | S2 |  | S5 | S7 |
| R2 | S2 |  | S4 | S7 |

Fig. 5

| GEAR | K1/K2 | S9/S10 | S11/S12 | S13/S14 | S7/S8 |
|---|---|---|---|---|---|
| 1 | K2 | | | S13 | S7 |
| 2 | K1 | S10 | | | S7 |
| 3 | K2 | | S11 | | S7 |
| 4 | K1 | S9 | | | S7 |
| 5 | K2 | | | S14 | S7 |
| 6 | K2 | S10 | | S13 | S8 |
| 7 | K1 | | S11 | | S8 |
| 8 | K2 | S9 | | | S8 |
| 9 | K1 | | | S14 | S8 |
| 10 | K2 | | S12 | | S8 |
| R | K2 | | | | S7 |

Fig. 7

| GEAR | K1/K2 | S9/S10 | S11/S12 | S13/S14 | S15 | S7/S8 |
|---|---|---|---|---|---|---|
| 1 | K2 | | | S13 | S15 | S7 |
| 2 | K1 | S10 | | | S15 | S7 |
| 3 | K2 | | S11 | | S15 | S7 |
| 4 | K1 | S9 | | | S15 | S7 |
| 5 | K2 | | | S14 | | S7 |
| 6 | K1 | S10 | S11 | S14 | | S7 |
| 7 | K2 | | | S13 | S15 | S8 |
| 8 | K1 | S10 | | | S15 | S8 |
| 9 | K2 | S9 | S11 | | S15 | S8 |
| 10 | K1 | | | S14 | S15 | S8 |
| 11 | K2 | S10 | S11 | S14 | | S8 |
| 12 | K1 | | S12 | | | S8 |
| R | K2 | | | | S15 | S7 |

| GEAR | K1/K2 | S9/S10 | S11/S12 | S13/S14 | S15/S16 | S7/S8 |
|---|---|---|---|---|---|---|
| 1 | K2 |  |  | S13 | S15 | S7 |
| 2 | K1 | S10 |  |  | S15 | S7 |
| 3 | K2 | S9 | S11 |  | S15 | S7 |
| 4 | K1 |  |  |  | S15 | S7 |
| 5 | K2 | S10 |  | S14 |  | S7 |
| 6 | K1 |  | S11 |  | S16 | (S8) |
| 7 | K2 | S9 |  |  | S16 | (S8) |
| 8 | K1 |  |  | S14 | S16 | S8 |
| 9 | K2 | S9 | S11 | S14 |  | S8 |
| 10 | K1 |  |  |  |  |  |
| R | K2 |  | S12 |  | S15 | S7 |

Fig. 14

| GEAR | K1/K2 | S9/S10 | S11/S12 | S13/S14 | S15/S16 | S7/S8 |
|---|---|---|---|---|---|---|
| 1 | K2 |  |  | S13 | S15 | S7 |
| 2 | K1 | S10 |  |  | S15 | S7 |
| 3 | K2 | S9 | S11 |  | S15 | S7 |
| 4 | K1 |  |  |  | S15 | S7 |
| 5 | K2 |  |  | S14 |  | S7 |
| 6 | K2 |  |  | S13 | S16 |  |
| 7 | K1 | S10 |  |  | S16 |  |
| 8 | K2 |  | S11 |  | S16 | (S8) |
| 9 | K1 | S9 |  | S14 | S16 | (S8) |
| 10 | K2 | S9 | S11 | S14 |  | S8 |
| 11 | K1 |  | S11 |  |  | S8 |
| R | K2 |  | S12 |  | S15 | S7 |

Fig. 16

| GEAR | K1/K2 | S9/S10 | S12/S17 | S11 | S13/S14 | S15/S16 | S7/S8 |
|---|---|---|---|---|---|---|---|
| 1 | K1 | S9 | | | | S15 | S7 |
| 2 | K2 | | | | S13 | S15 | S7 |
| 3 | K1 | | S17 | | | S15 | S7 |
| 4 | K2 | S10 | | S11 | | S15 | S7 |
| 5 | K1 | | | | | S15 | S7 |
| 6 | K2 | S9 | | | S14 | | S7 |
| 7 | K1 | | S17 | S11 | | S16 | |
| 8 | K2 | | | | S13 | S16 | |
| 9 | K1 | S10 | | | | S16 | |
| 10 | K2 | | | S11 | | S16 | |
| 11 | K1 | S10 | | S11 | S14 | | S8 |
| 12 | K2 | | S12 | | S14 | | S8 |
| R1 | K1 | | S12 | | | S15 | S7 |
| R2 | K2 | | S12 | | | S16 | |

| GEAR | K1/K2 | S9/S10 | S11/S12 | S13/S14 | S18/S19 | S7/S8 |
|---|---|---|---|---|---|---|
| 1 | K2 |  |  | S13 | S18 | S7 |
| 2 | K1 | S10 |  |  | S18 | S7 |
| 3 | K2 |  | S11 |  | S18 | S7 |
| 4 | K1 | S9 |  |  | S18 | S7 |
| 5 | K2 |  | S11 | S14 |  | S7 |
| 6 | K1 | S10 |  | S14 |  | S7 |
| 7 | K2 |  | S11 | S13 | S18 | S8 |
| 8 | K1 | S10 |  |  | S18 | S8 |
| 9 | K2 |  | S11 |  | S18 | S8 |
| 10 | K1 | S9 |  | S14 |  | S8 |
| 11 | K2 | S10 |  | S14 |  | S8 |
| 12 | K1 | S10 |  | S13 |  | S8 |
| C1 | K2 |  | S11 |  | S19 | S7 |
| C2 | K1 | S9 |  |  | S19 | S7 |
| C3 | K2 |  | S12 |  | S19 | S7 |
| C4 | K1 |  | S12 |  | S19 | S7 |
| R1 | K2 |  |  |  | S19 | S7 |
| R2 | K2 |  |  |  | S18 | S7 |

Fig. 18

| GEAR | K1/K2 | S9/S10 | S11/S12 | S13/S14 | S18/S19 | S20/S21 | S7/S8 |
|---|---|---|---|---|---|---|---|
| 1 | K2 |  |  | S13 | S18 | S20 | S7 |
| 2 | K1 | S10 |  |  | S18 | S20 | S7 |
| 3 | K2 | S9 | S11 |  | S18 | S20 | S7 |
| 4 | K1 | S10 |  | S14 | S18 | S20 | S7 |
| 5 | K2 |  | S11 |  | S18 |  | S7 |
| 6 | K1 | S9 |  |  | S18 | S21 | (S8) |
| 7 | K2 |  | S11 | S14 | S18 | S21 | (S8) |
| 8 | K1 | S9 |  | S13 | S18 |  | S8 |
| 9 | K2 |  |  |  | S18 | S20 | S8 |
| 10 | K1 | S9 | S11 |  | S19 | S20 | S7 |
| C1 | K2 | S10 |  |  | S19 | S20 | S7 |
| C2 | K1 |  | S11 |  | S19 | S20 | S7 |
| C3 | K2 | S9 |  |  | S19 | S20 | S7 |
| C4 | K1 |  |  |  | S19 | S20 | S7 |
| R1 | K2 |  | S12 |  | S18 | S20 | S7 |
| R2 | K2 |  | S12 |  | S18 | S20 | S7 |

Fig. 20

RATIO STEP OF A STEPPED TRANSMISSION, AND STEPPED TRANSMISSION

This application claims priority from German patent application serial no. 10 2012 213 667.3 filed Aug. 2, 2012.

FIELD OF THE INVENTION

The invention relates to a ratio step of a stepped transmission, by means of which at least two transmission shafts running on axes parallel to each other can be coupled together. The invention further relates to a stepped transmission, particularly a motor vehicle transmission, which uses at least one aforementioned transmission ratio step.

BACKGROUND OF THE INVENTION

Motor vehicle transmissions are predominantly implemented as stepped transmissions, wherein manually shifted transmissions, automatic shift transmissions and stepped automatic transmissions are common. In the simplest design, a stepped transmission has a ratio step by means of which a power flow can be guided from one transmission shaft to a transmission shaft running in parallel, via gears meshing together. In most cases however, a plurality of transmission steps can be connected into a power flow using appropriate shift elements, alone or in combination with each other, for implementing different gears of the respective stepped transmission. Additionally, in the case of a stepped transmission implemented as a motor vehicle transmission, a reverse gear can typically be implemented using a transmission step of a reverse direction of rotation, wherein with a common variant, the power flow is guided from the respective one transmission shaft via an intermediate gear of an intermediate shaft to the respective other transmission shaft so that the desired reversal of the direction of rotation can be attained due to the engagement of the intermediate gear with the gears of the transmission shafts.

The document DE 44 22 900 A1 discloses a stepped transmission in the form of a motor vehicle transmission, wherein here this motor vehicle transmission is implemented in group design, and is comprised of a main group having an upstream splitter group, and a downstream range group. Here, an input shaft, an output shaft and a driven shaft run coaxially to each other on a main shaft axis, which is provided with two parallel countershaft axes, each having a countershaft. The power flow can now be guided, starting from the input shaft, either via the two countershafts by means of appropriate ratio steps to the output shaft to the range group, or directly from the input shaft to the output shaft. One of the ratio steps of the main group is implemented on the side of the countershafts with spur gears, the teeth of which are formed lengthened axially, and mesh directly with a common spur war that can be fixed to the output shaft, and are connected in each case via an intermediate gear to a spur gear that likewise can be fixed to the output shaft. As a consequence, using this transmission step, either a forward gear of the stepped transmission can be implemented in that the idler gear meshing directly with the upstream spur gears is connected to the output shaft in a rotationally fixed manner, or a reverse gear can be shifted to in that the idler gear in engagement with the intermediate gears is coupled to the output shaft in a rotationally fixed manner.

SUMMARY OF THE INVENTION

Based on this prior art, the problem addressed by the present invention is to provide a ratio step of a stepped transmission by means of which a plurality of different transmission ratios can be implemented in a compact design.

According to the invention, at least two transmission shafts can be coupled together via a ratio step according to the invention, wherein the at least two transmission shafts run on axes parallel to each other. In the simplest case, exactly two transmission shafts running in parallel to each other can be connected together, one of which, for example, is an input shaft and the other is an output shaft, or one is an input or output shaft and the other is a countershaft. In terms of the invention however, three transmission shafts can also be provided, which can be coupled among themselves via a ratio step according to the invention. Thus, two input shafts of a double clutch transmission running coaxially to each other can each individually be connected, using the ratio step according to the invention, to a countershaft running parallel hereto, or to an output shaft. Likewise, using a ratio step formed according to the invention, a centrally running input or output shaft can also be coupled to countershafts of two reduction gearings provided in parallel to each other. Finally, particularly in the case of a double clutch transmission, even four transmission shafts can be coupled among one another using a ratio step according to the invention, that is, the two inputs shafts running coaxially to each other can be coupled to the countershafts of the two reduction gearings provided in parallel to each other.

The invention comprises the technical teaching that within the ratio step a planetary gear set is provided coaxial to a first axis; of the three transmission components of the planetary gear set, a first transmission component is connected, or can be connected, to the first axis which it drives, or can drive, and a second transmission component is in engagement with at least one spur gear, which is placed on a further axis that is parallel to the first axis. Here, a first transmission ratio can be shifted to by stopping a third transmission component of the planetary gear set, and a second transmission ratio can be implemented by connecting either the third transmission component or the second transmission component to the first axis, which it drives.

In other words, the ratio step according to the invention comprises a planetary gear set, which, with a first transmission component thereof, is connected in a rotationally fixed manner to a first axis, or alternatively, with the aforementioned variant, can be connected in a rotationally fixed manner. Additionally, a second transmission component of the planetary gear set meshes with at least one spur gear, which is placed in each case on a further axis, wherein this further axis in each case runs in parallel to the first axis. Now, two different transmission ratios can be implemented by means of the ratio step according to the invention, in that, for shifting into a first transmission ratio, a third transmission component of the planetary gear set is stopped, that is, prevented from rotating by fixing to a component at a fixed location. For representing a second transmission ratio, either the third transmission component can be connected to the first axis which it drives, or in a variant to this, the second transmission component can be connected to the first axis in a rotationally fixed manner.

By means of such a nested design of a ratio step, two transmission ratios can be implemented in a particularly compact manner. Because, due to the fact that the second transmission component of the planetary gear set, in addition to the connection within the planetary gear set, is also in engagement with at least one spur gear, and here, in interplay with this spur gear forms a spur gear stage, a planetary gear set and at least one spur gear set can be combined together in a small space. Here, two different transmission ratios can be implemented due to the connection possibilities of the transmission components of the planetary gear set. Because the two different transmission ratios can also be implemented with a low number of components, the ratio step according to the invention is additionally distinguished by a good power to weight ratio and lower manufacturing costs. Finally, simple assembly of this ratio step is possible in the scope of a stepped transmission.

In terms of the invention, "transmission components" of the planetary gear set mean a planet carrier guiding planetary gears, and two central gears, wherein each of the latter are in engagement with the planetary gears of the planet carrier. Here, depending on the specific embodiment of the ratio step, the two central gears can be a sun gear having external teeth and a ring gear having internal teeth, or also two sun gears having external teeth.

According to one advantageous embodiment of the invention, the second transmission component is implemented as a ring gear, which at its internal teeth is connected to the remaining transmission components, and at external teeth meshes with the at least one spur gear. Such an embodiment of the ratio step has the advantage that all gear engagements can be placed in one gear plane which leads to a particularly compact axial design of the ratio step.

In a further development of the aforementioned embodiment, the first transmission component is formed by a sun gear, which is connected to the ring gear by means of interposed planetary gears of a planet carrier that forms the third transmission component. With such a design of the ratio step, two different directions of rotation occur with the two transmission ratios that can be implemented, in that on one hand, the planet carrier is fixed, and on the other hand, either the planet carrier or the ring gear is connected in a rotationally fixed manner to a first transmission shaft provided by the first axis. Thus as a consequence, using the ratio step, both a forward and a reverse gear can be shifted to in a compact design. Compared to otherwise typical systems, such as DE 44 22 900 A1 for example, such a design has the advantage of reducing axial construction length, and additionally a respective intermediate gear can be omitted together with the associated bearing locations. As a consequence, housing sectioning points of a respective transmission housing can be freely selected, which otherwise would have to be provided in the region of the respective intermediate gear for the assembly thereof. Finally, a coasting mode in the reverse gear can also be implemented without critical bearing issues, whereas with a system having an intermediate gear, as with DE 44 22 900 A1 for example, strong bearing forces occur in coasting mode in the region of the intermediate shaft supporting the intermediate gear. Additionally, due to the nested design of the ratio step, a reverse gear can be implemented with a higher transmission ratio, because a transmission ratio of the planetary gear set is in effect, in addition to the transmission ratio defined by the engagement with the at least one spur gear.

According to an alternative embodiment of the invention, the first transmission component is formed by a planet carrier of the planetary gear set, which guides planetary gears that each mesh both with a sun gear forming the third transmission component as well as with the ring gear. Due to such a design of the nested ratio step according to the invention, two transmission ratios having the same direction of rotation can be implemented in a compact manner.

According to a further, advantageous embodiment of the invention, the second transmission component of the planetary gear set meshes with two spur gears, which each are provided on an axis running parallel to the first axis. Thus, the second transmission component of the planetary gear set meshes with two spur gears, which then are disposed on transmission shafts running parallel to each other in the case of use with a stepped transmission. Particularly if these two parallel axes are placed in a common plane with the intermediately located first axis, then the second transmission component is compensated for with respect to radial forces; this substantially simplifies a mounting of the second transmission component. Thus, it is possible that no individual bearing is required, rather an axial fixing is sufficient, for example using a thrust collar.

According to the invention, a stepped transmission, with which a ratio step according to the invention is used, comprises at least two transmission shafts running on axes parallel to each other, which can be coupled together using at least one ratio step. Here, at least one ratio step is configured according to the invention as a nested ratio step. In terms of the invention, such a stepped transmission can be a manual shift transmission, an automatic shift transmission or a stepped transmission, particularly a double clutch transmission of a passenger vehicle. Additionally, an embodiment as an automatic shift transmission in a compact design, or grouped design, or as a stepped automatic transmission, particularly a double clutch transmission of a commercial vehicle, is also conceivable.

A compact design in the axial direction of the respective stepped transmission can be attained with the use of one or more nested ratio steps according to the invention. Depending on the embodiment of the respective nested ratio step, in one gear plane, one forward gear and one reverse gear can be shifted to, or two different forward gears can be implemented, wherein the latter is used with a stepped transmission of a commercial vehicle, particularly for implementing crawler gears.

The invention is not limited to the stated combination of features of the described embodiments. Moreover, the possibility arises to combine together individual features, which arise from the following description of embodiments, or directly from the drawings. The reference of the claims to the drawings through use of reference numbers shall not limit the scope of protection of the claims.

BRIEF DESCRIPTION OF THE DRAWINGS

Further advantageous embodiments of the invention arise from the subsequent description of preferred embodiments of the invention with reference to the figures represented in the drawings. Shown are:

FIG. 3 an example shift pattern of the stepped transmission from FIG. 1 and FIG. 2;

FIG. 5 an example shift pattern of the stepped transmission from FIG. 4;

FIG. 7 an example shift pattern of the stepped transmission from FIG. 6;

FIG. 10 an example shift pattern of the stepped transmission from FIG. 8 and FIG. 9;

FIG. 13 an example shift pattern of the stepped transmission from FIG. 11 and FIG. 12;

FIG. 14 a further example shift pattern of the stepped transmission from FIG. 11 and FIG. 12;

FIG. 16 an example shift pattern of the stepped transmission from FIG. 15;

FIG. 18 an example shift pattern of the stepped transmission from FIG. 17;

FIG. 20 an example shift pattern of the stepped transmission from FIG. 19.

DETAILED DESCRIPTION OF THE PREFERRED EMBODIMENTS

Figure 1:
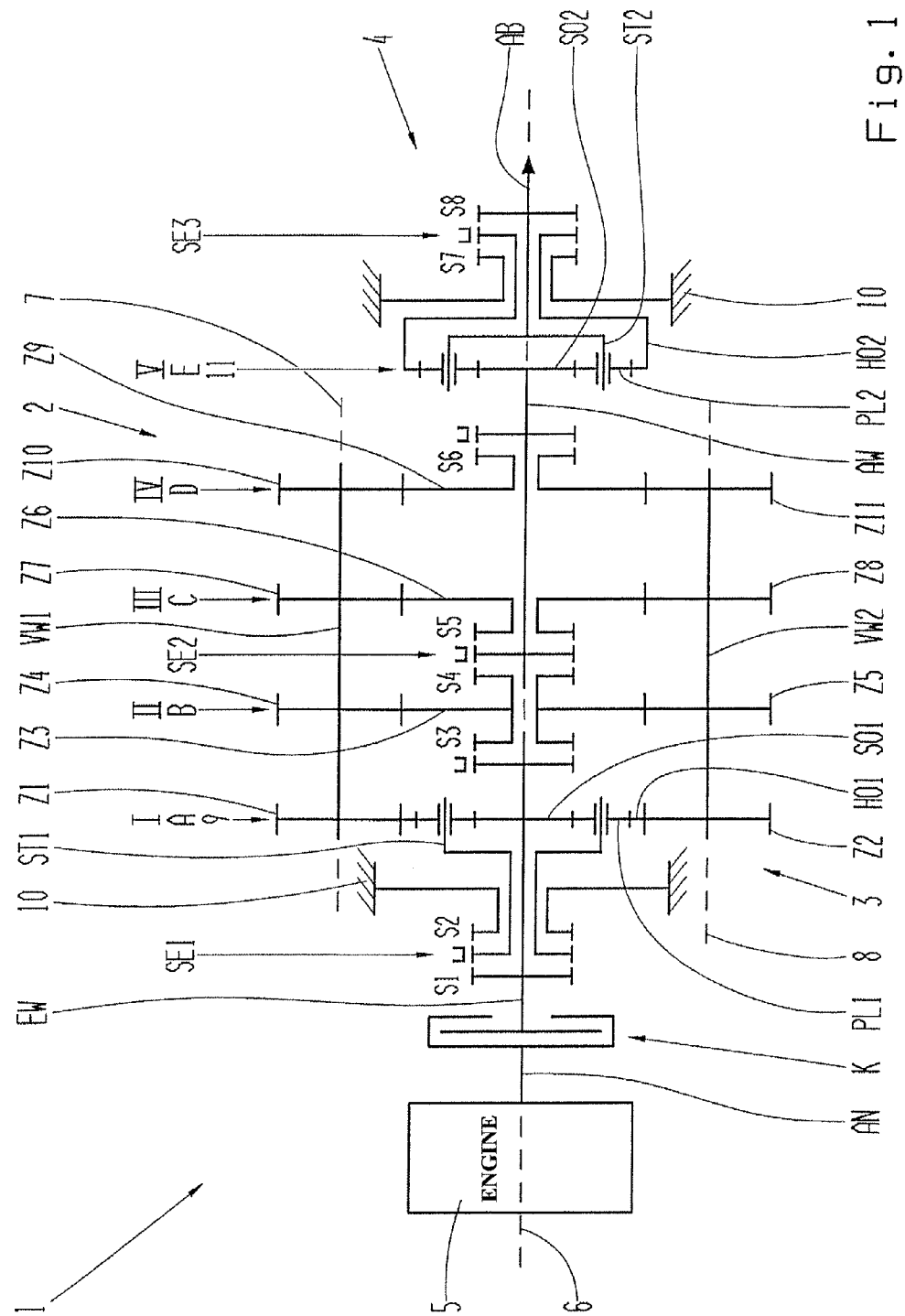
FIG. 1 a schematic view of a stepped transmission according to a first preferred embodiment of the invention.

FIG. 1 shows a schematic view of a stepped transmission 1 according to a first embodiment of the invention, wherein the stepped transmission 1 is used particularly as a motor vehicle transmission of a commercial vehicle. Here, the stepped transmission 1 is implemented in groups and is comprised of a main group 2, a splitter group 3 upstream of the main group 2, and a range group 4 downstream of the main group 2. In addition, the stepped transmission 1 is connected at a drive side AN to an internal combustion engine 5, and is connected at an output side AB to a drive train of the commercial vehicle, not shown in more detail.

As seen in FIG. 1, the main group 2 and the splitter group 3 together form a transmission implemented in a countershaft design, the input shaft EW and the output shaft AW of which, together with the drive side AN and the output side AB, are located on a main shaft axis 6. Here, the input shaft EW can be connected to the drive side AN using a load shifting element K, whereas the output shaft AW can be coupled to the output side AB using the interposed range group 4. Here, the load shifting element K is implemented particularly as a dry clutch, however, just as easily can be implemented as a wet clutch. Additionally, the countershaft transmission formed from the main group 2 and the splitter group 3 has two countershaft axes 7 and 8, located parallel to the main shaft axis 6, upon each of which respectively a countershaft VW1, or respectively VW2 is placed. Four ratio steps A, B, C and D in four gear planes I to IV, following each other axially, are provided between the countershaft axes 7 and 8 and the interposed main shaft axis 6; using the four ratio steps individually either the input shaft EW or the output shaft AW can be coupled in each case to the two countershafts VW1 and VW2, such that a power flow, except for a direct coupling of the input shaft EW to the output shaft AW, is guided in equal parts via the two countershafts VW1 and VW2.

As a special feature here, the ratio step A located in the first gear plane I comprises a (upstream) planetary gear set 9, which is coaxial to the main shaft axis 6, and together with spur gears Z1 and Z2 defines a nested design of the ratio step A, wherein the spur gear Z1 is provided on the countershaft VW1 in a rotationally fixed manner and the spur gear Z2 is provided on the countershaft VW2 in a rotationally fixed manner. Here with the planetary gear set 9, a sun gear SO1 is disposed on the input shaft EW in a rotationally fixed manner, and is connected to a ring gear HO1 of the planetary gear set 9 via planetary gears PL1. The nesting in conjunction with the spur gears Z1 and Z2 is now formed in that the ring gear HO1 meshes at inner teeth thereof with the planetary gears PL1, and is also in engagement at outer teeth thereof with the two spur gears Z1 and Z2.

Using the ratio step A, rotational movement of the input shaft EW can now be transferred, using two different transmission ratios respectively, to the two countershafts VW1 and VW2 running in parallel. For implementing a first transmission ratio, a planet carrier ST1 guiding the planetary gears PL1 can be coupled to the input shaft EW in a rotationally fixed manner using a first shift element S1, so that as a consequence the sun gear SO1 and the planet carrier ST1 rotate as one, and the planetary gears PL1 that are not rotating here about their respective axes carry along the ring gear HO1. The ring gear HO1 then transfers this rotational movement in turn to the two spur gears Z1 and Z2.

In addition, a second transmission ratio of the ratio step A is implemented in that the planet carrier ST1 is fixed to a transmission housing 10 using a shift element S2. As a result, rotational movement of the planet carrier ST1 is prevented so that consequently rotational movement of the sun gear SO1 running with the input shaft EW is translated by means of the interposed planetary gears PL1 into rotational movement of the ring gear HO1 in the opposite direction compared to the first transmission ratio. Here, the planetary gears rotate about their respective axes on the planet carrier ST1. Effectively, the rotational movement of the ring gear HO1 in the opposing direction, also results in opposing rotational movement of the spur gears the Z1 and Z2, and thus also the countershafts the VW1 and VW2. Accordingly, using the ratio step A, a forward gear and a reverse gear can be defined due to the two coupling possibilities of the planet carrier ST1.

The ratio step B, which is comprised of a spur gear Z3 mounted rotatably, coaxial to the input shaft EW and the output shaft AW, and two spur gears Z4 and Z5, located on both sides of the spur gear Z3, is provided adjacent to the ratio step A in the second gear plane II. The two spur gears Z4 and Z5 are each engaged with the interposed spur gear Z3, wherein the spur gear Z4 is placed on the countershaft VW1 in a rotationally fixed manner and the spur gear Z5 is placed on the countershaft VW2 in a rotationally fixed manner. The spur gear Z3 can now be fixed to the input shaft EW by means of a third shift element S3, and using a fourth shift element S4 can be fixed to the output shaft AW. As a consequence of the rotationally fixed coupling of the spur gear Z3 to the input shaft EW, rotational movement of the input shaft EW is transferred to the two countershafts VW1 and VW2 due to the gear engagement of the spur gear Z3 with the spur gears Z4 and Z5, wherein this rotational movement is then guided using one of the ratio steps C or D of the subsequent gear planes III and IV again to the output shaft AW. In contrast, with fixing the spur gear Z3 to the output shaft AW, partial power flows guided via the two countershafts VW1 and VW2 are combined again on the output shaft AW. Accordingly, rotational movement of the input shaft EW transmitted via the ratio step A to the countershafts VW1 and VW2, can in turn be transferred to the output shaft AW. Finally, the spur gear Z3, with simultaneous actuation of the shift element S3 and the shift element S4, can also be coupled to both the input shaft EW and also to the output shaft AW in a rotationally fixed manner, so that consequently both the input shaft EW and the output shaft AW are connected together in a rotationally fixed manner. As a result, a fixed drive is implemented from the input shaft EW to the output shaft AW.

The ratio step C, which is comprised of a spur gear Z6, and two further spur gears Z7 and Z8, each in engagement with the spur gear Z6, is provided adjacent to the ratio step B in the third gear plane III. Here, the spur gear Z6 is mounted rotatably on the output shaft AW, whereas the spur gear Z7 is placed on the countershaft VW1 in a rotationally fixed manner, and the spur gear Z8 is placed on the countershaft VW2 in a rotationally fixed manner. Partial power flows guided via the countershafts VW1 and VW2 can be combined in turn via the output shaft AW, in that the spur gear Z6 is fixed to the output shaft AW via a shift element S5.

A further ratio step is provided with the ratio step D in the gear plane IV that is formed here by spur gears Z9, Z10 and Z11. Similar to the design of the adjacent ratio step C, the spur gear Z9 is mounted rotatably on the output shaft AW, and meshes both with the spur gear Z10 disposed on the countershaft VW1 in a rotationally fixed manner, and also with the spur gear Z11 disposed on the countershaft VW2 in a rotationally fixed manner. Rotational movements of the countershafts VW1 and VW2 can now be transmitted using the ratio step D to the interposed output shaft AW, in that the spur gear Z9 is fixed to the output shaft AW via a shift element S6.

Finally, downstream of the countershaft transmission formed by the splitter group 3 and the main group 2, there is the range group 4 located in a fifth gear plane V that is formed here by a ratio step E in the form of a planetary stage 11. Using this planetary stage 11, rotational movement of the output shaft AW can be transferred using different ratios to the output side AB and represent different drive ranges. Here, a sun gear SO2 of the planetary stage 11 is disposed on the output shaft AW in a rotationally fixed manner, and meshes with the planetary gears PL2, which are guided using a common planet carrier ST2 that in turn is in engagement with the output side AB in a rotationally fixed manner. Along with a sun gear SO2, the planetary gears PL2 additionally mesh with a ring gear HO2, wherein this ring gear HO2, for implementing a transmission ratio assigned to a first drive range, is fixed to the transmission housing 10 using a shift element S7, and, for shifting to a transmission ratio assigned to a second drive range, can be coupled to the output side AB in a rotationally fixed manner using a shift element S8. In the latter named case, the ring gear HO2 and the planet carrier ST2 rotate together as one.

The shift elements S1 to S8 presently are each implemented as locking synchronizations by means of the respective actuation of which the respective spur gear Z3, or Z6, or Z9, or the respective transmission component ST1 or HO2, after reduction of speed differences, is coupled to the respective shaft EW or AW or AB, or is fixed to the transmission housing 10. Alternatively, an embodiment of the shift elements S1 to S8 is also conceivable as differently implemented form locking shift elements or also as force locking shift elements, for example multi-disk clutches.

As also seen in FIG. 1, now the shift element S1 and the shift element S2 are respectively combined in a shift device SE1, the shift element S4 and the shift element S5 are respectively combined in a shift device SE2, and the shift element S7 and the shift element S8 are respectively combined in a shift device SE3. These shift devices SE1 to SE3 are equipped as double synchronizations, with which the respectively associated shift elements S1 and S2, or S4 and S5, or S7 and S8 each have a common shift collar, which can be moved in a targeted manner using an assigned actuator either into an actuation position of the respective one shift element S1 or S4 or S7, or into an actuation position of the respective other shift element S2 or S5 or S8. In contrast, the shift elements S3 and S6 are each implemented as individual synchronizations, with which a respective shift collar can be moved from a neutral position into a shift position using an associated actuator.

Figure 2:
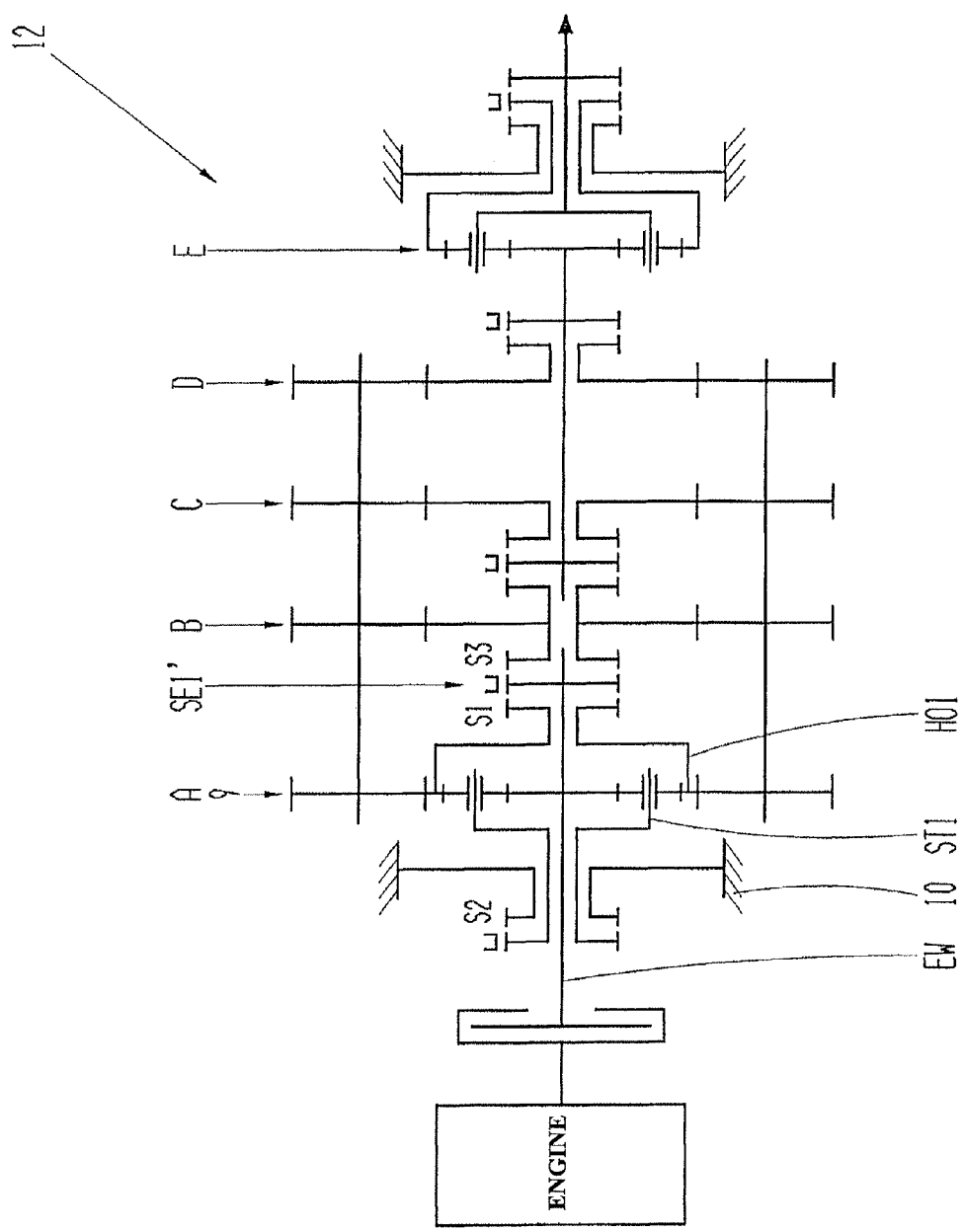
FIG. 2 a schematic representation of a stepped transmission according to a second embodiment of the invention.

FIG. 2 shows a second preferred embodiment of a stepped transmission 12 according to the invention, wherein in contrast to the transmission variant according to FIG. 1, here the planet carrier ST1 can only be fixed to the transmission housing 10 using the shift element S2, whereas the shift element S1 in this case, upon actuation, couples the input shaft EW to the ring gear HO1 of the planetary stage 9 in a rotationally fixed manner. Here, the shift element S1 is combined with the shift element S3 to shift device SE1', while the shift element S2 is now present as an individual synchronization. Apart from that, the embodiment of the stepped transmission 12 from FIG. 2 corresponds to the stepped transmission 1 from FIG. 1.

FIG. 3 shows an example shift pattern that can be implemented by both the stepped transmission 1 from FIG. 1 as well as by the stepped transmission 12 from FIG. 2. As seen here, the shift elements S1 and S3, the shift elements S4 and S5 and shift elements S7 and S8 are respectively actuated alternatively to each other. The stepped transmissions 1 and 12 can each implement a total of twelve forward gears and three reverse gears, wherein for gear changes, a connection of the input shaft EW to the drive side AN is to always be disconnected using the load shifting element K, and is to be connected again only after a change the respective shift elements S1 to S8. Accordingly, gear changes with the stepped transmissions 1 and 12 can be implemented only with an interruption of the tractive force.

For shifting to a first forward gear, the shift elements S1, S6 and S7 are actuated, while for implementing a second forward gear, the shift elements S3, S5 and S7 are to be actuated. A further, third forward gear results from actuating the shift elements S1, S4 and S7, and a fourth forward gear results from actuating the shift elements S3, S6 and S7. A fifth forward gear can then be shifted to by actuating the shift elements S1, S5 and S7, and following this, a sixth forward gear can be shifted to by actuating the shift elements S3, S4 and S7. Then, for implementing a seventh forward gear, the shift elements S1, S6 and S8 are transferred into an actuated state, whereas, for shifting into an eighth forward gear, the shift elements S3, S5 and S8 are actuated. Following this, a ninth forward gear is shifted to by actuating the shift elements S1, S4 and S8, whereas a tenth forward gear can be selected by actuating the shift elements S3, S6 and S8. Finally, an eleventh forward gear can be shifted to by means of actuating the shift elements S1, S5 and S8, whereas a twelfth forward gear can be shifted to using the shift elements S3, S4 and S8.

A first reverse gear can be shifted to by actuating the shift element S6, S2 and S7, whereas a second reverse gear can be implemented by actuating the shift element S5, S2 and S7. Finally, a third reverse gear results from actuating the shift element S4, S2 and S7.

Figure 4:
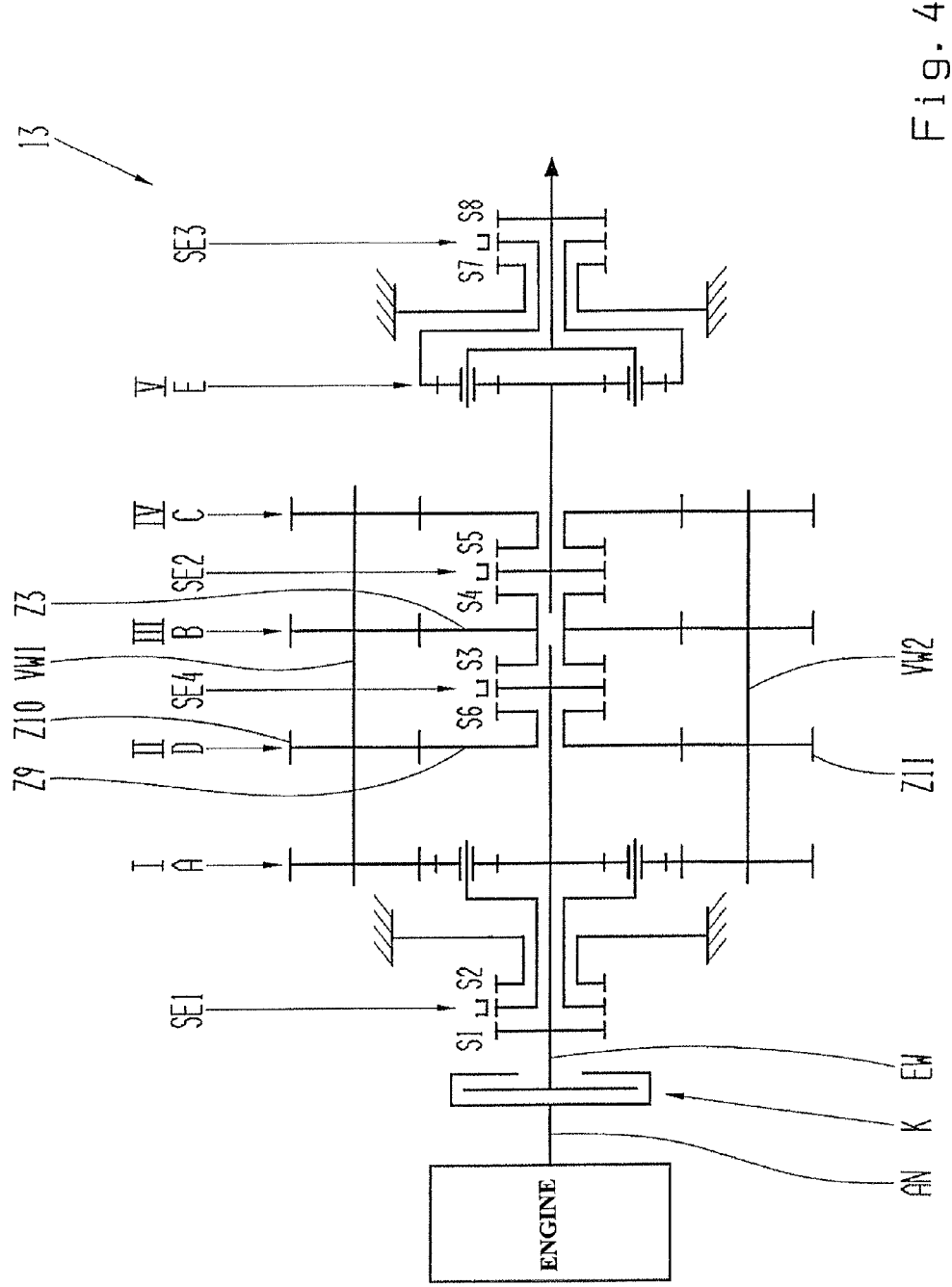
FIG. 4 a schematic representation of a stepped transmission according to a third preferred embodiment of the invention.

In addition, FIG. 4 shows a third preferred embodiment of a stepped transmission 13. In contrast to the stepped transmission 1 from FIG. 1, here the ratio step B is placed in the third gear plane III and the ratio step C is placed in the fourth gear plane IV, while the ratio step D is disposed in the second gear plane II axially between the ratio step A and the ratio step B. In addition, the spur gear Z9 of the ratio step D is mounted rotatably on the input shaft EW, and upon actuation of the shift element S6 is coupled to the input shaft EW in a rotationally fixed manner, so that consequently, rotational movement of the input shaft EW is transferred to the two countershafts VW1 and VW2, running in parallel, by means of the ratio step D due to the engagement of the spur gear Z9 with the spur gears Z10 and Z11. Here, the shift element S6 is combined with the shift element S3, using which the spur gear Z3 of the ratio step B can be coupled to the input shaft EW in a rotationally fixed manner, contained in a shift device SE4. Apart from that, the embodiment of the stepped transmission 13 from FIG. 4 corresponds to the stepped transmission 1 from FIG. 1.

FIG. 5 shows an example shift pattern that can be implemented using the stepped transmission 13 from FIG. 4. Here, the shift elements S1 and S2, the shift elements S6 and S3, and shift elements S4 and S5, and the shift elements S7 and S8, are respectively actuated alternatively to each other. Additionally, after actuation of the respectively associated shift elements of each gear, the input shaft EW is coupled to the drive side AN using the load shifting element K, in order to transfer rotational movement of the drive side AN to the input shaft EW. However during a gear change, the load shifting element K is to be disengaged until the respectively associated shift elements have been actuated. As a consequence of this, a gear change using the stepped transmission 13 is possible only with an interruption of tractive force.

A first forward gear results from actuation of the shift elements S6, S5, and S7, while, for shifting to a second forward gear, the shift elements S1, S5 and S7 are actuated. Additionally, a third forward gear can be implemented by actuating the shift elements S3, S5 and S7, and a fourth forward gear can be implemented by actuating the shift elements S6, S4 and S7. A fifth forward gear is shifted to in that the shift elements S1, S4 and S7 are actuated, whereas for implementing a sixth forward gear, the shift elements S3, S4 and S7 are actuated. Further, for implementing a seventh forward gear, the shift elements S6, S5 and S8 are transferred into an actuated state, whereas for shifting into an eighth forward gear the shift elements S1, S5 and S8 are actuated. A ninth forward gear is implemented in that the shift elements S3, S5 and S8 are actuated, whereas a tenth forward gear can be shifted to by actuating the shift elements S6, S4 and S8. Finally, an eleventh forward gear results from actuating the shift elements S1, S4 and S8, and a twelfth forward gear results from actuating the shift elements S3, S4 and S8.

In contrast, a first reverse gear is implemented by actuating the shift elements S2, S5, and S7, and a second reverse gear is implemented by means of actuating the shift elements S2, S4 and S7.

Figure 6:
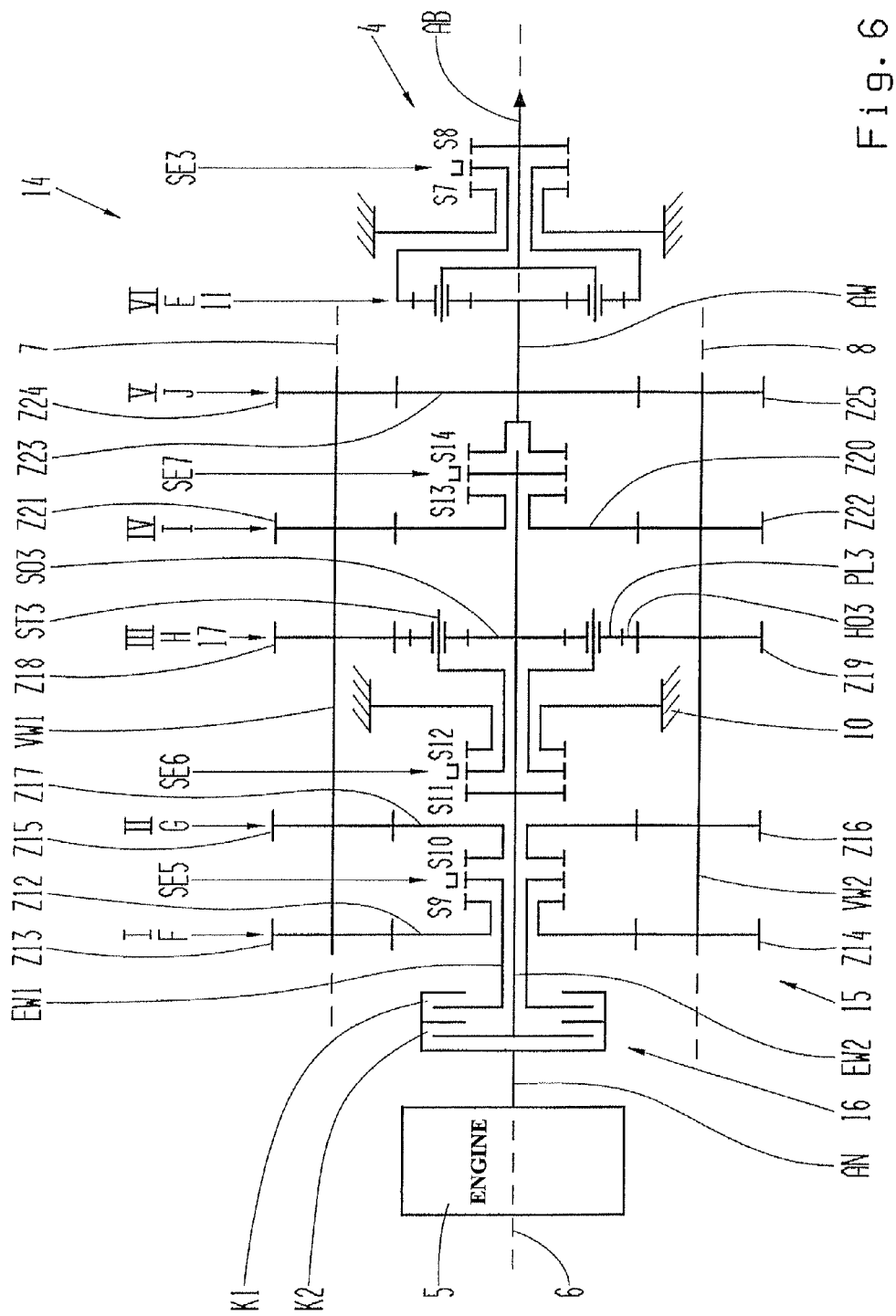
FIG. 6 a schematic view of a stepped transmission according to a fourth preferred embodiment.

Additionally, FIG. 6 shows a fourth embodiment of a stepped transmission 14 according to the invention. Here, this stepped transmission 14 is also implemented in a group design, wherein, in contrast to the stepped transmission 1 from FIG. 1, a main group 15 is provided between the drive side AN, in connection to the internal combustion engine 5, and the range group 4, and is designed in the manner of a double clutch transmission. Accordingly, the main group 15 combines two partial transmissions which each have an input shaft EW1 and EW2. The two input shafts EW1 and EW2 are each coaxial to the main shaft axis 6, as is also an output shaft AW. As further seen in FIG. 6, the input shaft EW1 is implemented here as a transmission hollow shaft with the input shaft EW2 formed as a transmission central shaft running coaxially thereto. The drive side AN can now be connected to the input shaft EW1 using a load shifting element K1, and to the input shaft EW2 using a load shifting element K2, wherein the two load shifting elements K1 and K2 are combined in a double clutch 16. This double clutch 16 is preferably formed as a wet double clutch, however in the case where low torque is to be transmitted, can also be implemented as a dry double clutch.

Two countershafts VW1 and VW2 are placed on the countershaft axes 7 and 8, which are parallel to the main shaft axis 6, and are in turn parallel to the input shaft EW1 and EW2 and also to the output shaft AW. Here, these countershafts VW1 and VW2, can each be coupled to the input shaft EW1 using two ratio steps F and G, to the input shaft EW2 using the ratio steps H and I, and to the output shaft AW using a ratio step J.

Here, the ratio step F is provided in a first gear plane I of the stepped transmission 14, where the ratio step F has a spur gear Z12 mounted rotatably on the input shaft EW1, wherein this spur gear Z12 is in engagement both with a spur gear Z13 disposed on the countershaft VW1 in a rotationally fixed manner, as well as to a spur gear Z14 placed on the countershaft VW2 in a rotationally fixed manner. For transmitting rotational movement of the input shaft EW1 to the two countershafts VW1 and VW2, the spur gear Z12 can be fixed to the input shaft EW1 using the shift element S9.

The ratio step G is provided adjacent to the ratio step F in a second gear plane II of the stepped transmission 14, and comprises a spur gear Z15 provided on the countershaft VW1 in a rotationally fixed manner, and a spur gear Z16 placed on the countershaft VW2 in a rotationally fixed manner. The two spur gears Z15 and Z16 are each in engagement with an interposed spur gear Z17 which is mounted rotatably on the input shaft EW2, and can be connected to the input shaft EW1 in a rotationally fixed manner using a shift element S10. Accordingly, upon actuation of the shift element S10, a power flow originating from the input shaft EW1 is divided to the two countershafts VW1 and VW2.

Additionally, the ratio step H is provided in a third gear plane III of the stepped transmission 14 and is implemented similarly to the ratio step A from FIG. 1 as a nested ratio step. Thus, the ratio step H comprises a planetary gear set 17, which is coaxial to the main shaft axis 6 and which in conjunction with spur gears Z18 and Z19 can transmit rotational movement of the input shaft EW2 to the two countershafts VW1 and VW2. Here, the planetary gear set 17 comprises a sun gear SO3, which is placed on the input shaft EW2 in a rotationally fixed manner and which is in engagement with a ring gear HO3 of the planetary gear set 17 via a plurality of planetary gears PL3. This ring gear HO3 is in engagement at inner teeth with the planetary gears PL3 and also has outer teeth, by means of which the ring gear HO3 meshes both with the spur gear Z18 and also with the spur gear Z19. Here, the spur gear Z18 is disposed on the countershaft VW1 in a rotationally fixed manner, and the spur gear Z19 is disposed on the countershaft VW2 in a rotationally fixed manner.

The planetary gears PL3 are guided via a planet carrier ST3, which can be coupled to the input shaft EW2 in a rotationally fixed manner via a shift element S11, and which, by means of a shift element S12, can be fixed to the transmission housing 10 of the stepped transmission 14. As with the ratio step A of the stepped transmission 1 from FIG. 1, an actuation of the shift element S11 and thus with it, a coupling of the planet carrier ST3 to the input shaft EW2, causes a rotation as a whole of the planet carrier ST3 together with the sun gear SO3. Here, this defines a forward gear of the stepped transmission 14. In contrast, fixing the planet carrier ST3 to the transmission housing 10 leads the ring gear HO3 to rotate in the opposite direction, and thus also the spur gears Z18 and Z19, so that a reverse gear of the main group 15 is implemented due to this rotational movement in the opposing direction.

The ratio step I is provided in a fourth gear plane IV adjacent to the ratio step H, and is formed by a spur gear Z20 mounted rotatably on the input shaft EW2, and two spur gears Z21 and Z22 each in engagement with the spur gear Z20. The spur gear Z20 can be fixed to the input shaft EW2 via a shift element S13, so that in conjunction with the spur gear Z21 provided on the countershaft VW1 in a rotationally fixed manner and the spur gear Z22 provided on the countershaft VW2 in a rotationally fixed manner, a power flow can be distributed to the two countershafts VW1 and VW2.

As further seen in FIG. 6, the output shaft AW of the stepped transmission 14 is permanently coupled to the two countershafts VW1 and VW2 via the ratio step J. Here, the ratio step J is provided in a fifth gear plane V of the stepped transmission 14 and comprises a spur gear Z23, provided on the output shaft AW in a rotationally fixed manner, which meshes both with a spur gear Z24 disposed on the countershaft VW1 in a rotationally fixed manner and also with a spur gear Z25 placed on the countershaft VW2 in a rotationally fixed manner. As a consequence of this, a power flow distributed to the two countershafts VW1 and VW2 is always combined again onto the output shaft AW via the ratio step J. Apart from this however, the output shaft AW can be connected directly to the input shaft EW2 in a rotationally fixed manner via a shift element S14, whereby there is a rigid drive from the input shaft EW2 to the output shaft AW.

Finally, the range group 4, which is formed by the ratio step E, is provided in a sixth gear plane VI. Here the ratio step E is formed the same way as with the stepped transmission 1 from FIG. 1, thus formed by a planetary stage 11.

Here with the stepped transmission 14, the shift elements S7 to S14 are again also preferably implemented as a locking synchronization, by means of which the respective spur gear Z12 or Z17 or Z20, or the respective transmission component of the planetary gear set 17 or the planetary gear set 11 is connected to the respective shaft EW1 or EW2 or AB in a rotationally fixed manner after eliminating speed differences. In contrast, in the case of the shift element S14, the input shaft EW2 and the output shaft AW are coupled together in a rotationally fixed manner after eliminating speed differences. In the case of the stepped transmission 14, in principle, an embodiment of the shift elements S7 to S14 as otherwise form-locking shift elements or even as force-locking shift elements, for example as multi-disk clutches, is conceivable.

As seen in FIG. 6, the shift element S7 and the shift element S8 are again combined to the shift device SE3, wherein additionally the shift element S9 and the shift element S10 are combined to a shift device SE5, the shift element S11 and the shift element S12 are combined to a shift device SE6, and the shift element S13 and the shift element S14 are combined to a shift device SE7. In the individual shift devices SE3 and SE5 to SE7, in each case using a common shift collar actuate either in a first shift position, the respective one shift element S7 or S9 or S11 or S13, or in a second shift position, the respective other shift element S8 or S10 or S12 or S14.

FIG. 7 now highlights an example shift pattern of a stepped transmission 14. Here, a total of ten forward gears and one reverse gear can be engaged. Here, the forward gears can be shifted under load, with the exception of shifting from a fifth forward gear into a sixth forward gear where a shift in the range group 4 must be performed. This is achieved in that, during travel in a gear and in the case of guiding the power flow via one of the two partial transmissions into the respective other partial transmission, the participating elements of the shift elements S9 to S14 for implementing a subsequent gear were already preselected, and ultimately for shifting, only the load shifting element K1 or K2 of the one partial transmission is disengaged and immediately after that the load shifting element K2 or K1 of the other partial transmission is engaged.

Presently, a first forward gear is implemented by engaging the load shifting element K2, and actuating the shift element S13 and S7, whereas a second forward gear results from engaging the load shifting element K1 and actuating the shift elements S10 and S7. A further, third forward gear is shifted to, in that the load shifting element K2 is engaged and the shift elements S11 and S7 are transferred into an actuated state. A fourth forward gear can be implemented by engaging the load shifting element K1 and actuating the shift elements S9 and S7, whereas a fifth forward gear is defined by engaging the load shifting element K2 and actuating the shift elements S14 and S7. Additionally, a sixth forward gear results in that again the load shifting element K2 is engaged and the shift elements S13 and S8 are transferred into an actuated state. A seventh forward gear is shifted to by engaging the load shifting element K1 and actuating the shift elements S10 and S8, whereas an eighth forward gear can be implemented using the load shifting element K2 and the shift elements S11 and S8. Finally, a ninth forward gear results by actuating the load shifting element K1 and the shift elements S9 and S8, and a tenth forward gear results by engaging the load shifting element K2 and actuating the shift elements S14 and S8. A reverse gear of the stepped transmission 14 can be shifted to by engaging the load shifting element K2 and actuating the shift elements S12 and S7.

Figure 8:
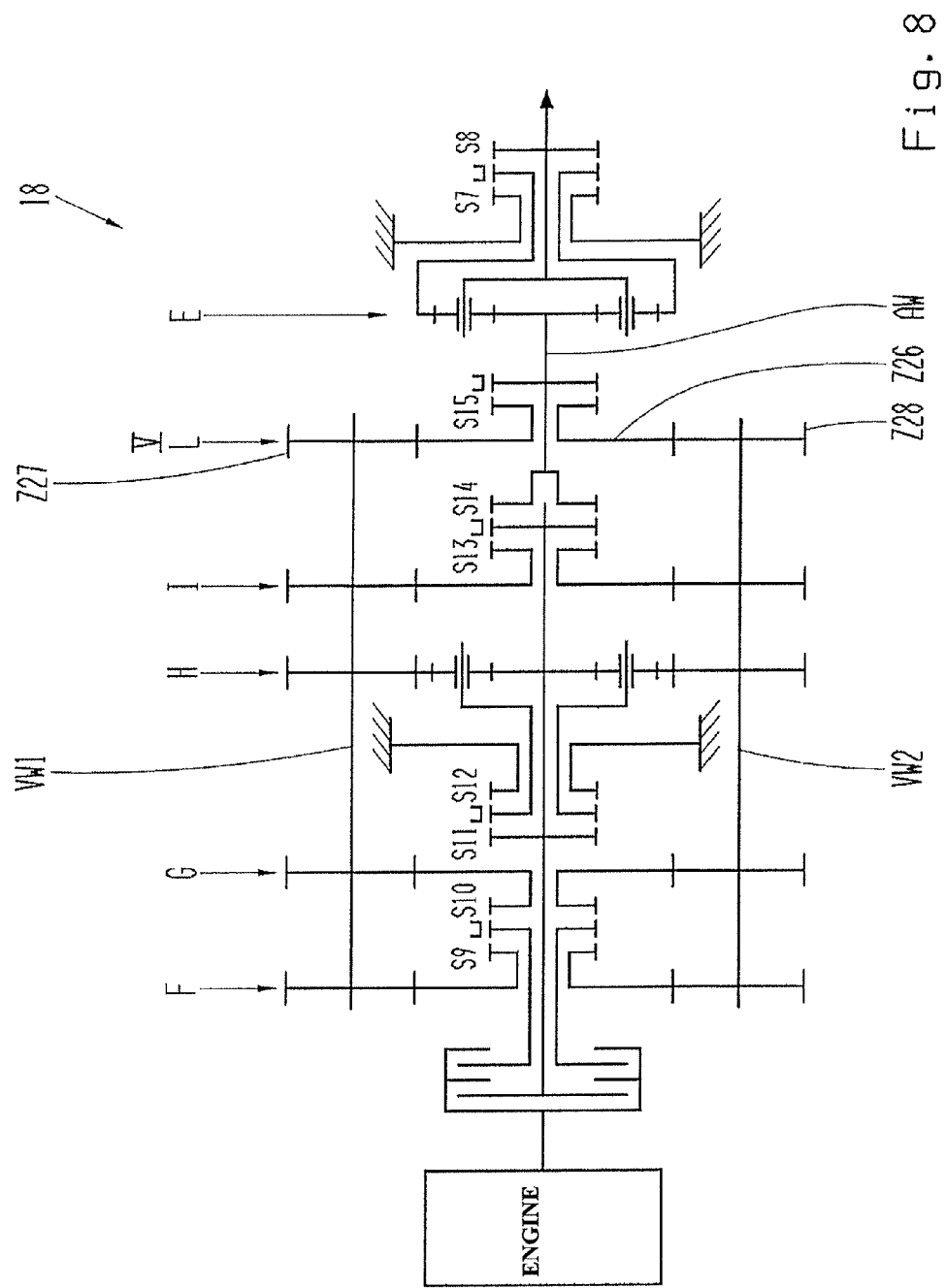
FIG. 8 a schematic representation of a stepped transmission according to a fifth embodiment.

FIG. 8 shows a fifth preferred embodiment of a stepped transmission 18, wherein the stepped transmission 18 largely corresponds to the stepped transmission 14 from FIG. 6. The only difference from the stepped transmission 14 is that, in a fifth gear plane V, there is a step ratio L, whose output shaft-side spur gear Z26 is mounted rotatably on the output shaft AW. The spur gear Z26 can now be fixed to the output shaft AW by means of a shift element S15 and is in engagement with a spur gear Z27 placed on the countershaft VW1 in a rotationally fixed manner and with a spur gear Z28 placed on the countershaft VW2 in a rotationally fixed manner. In the case of the rotationally fixed connection of the spur gear Z26 to the output shaft AW, after branching the power onto the two countershafts VW1 and VW2, there is recombination onto the output shaft AW. Apart from that, the stepped transmission 18 according to FIG. 8 corresponds to the stepped transmission 14 from FIG. 6.

Figure 9:
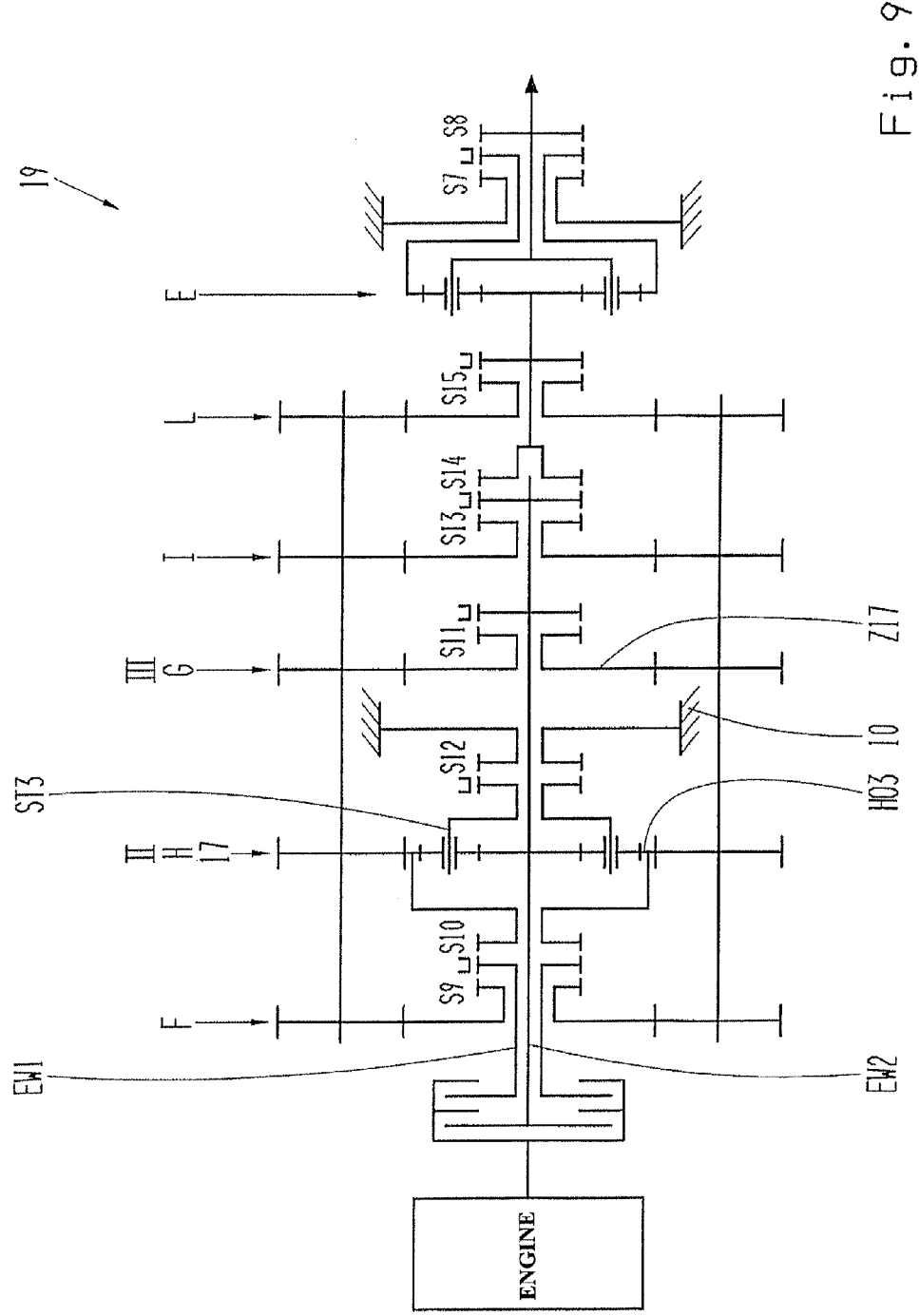
FIG. 9 a schematic representation of a stepped transmission according to a sixth preferred embodiment.

FIG. 9 shows a schematic representation of a sixth possible embodiment of a stepped transmission 19. The stepped transmission 19 largely corresponds to the stepped transmission 18 of the prior embodiment, wherein, in contrast to the stepped transmission 18 from FIG. 8 and also the stepped transmission 14 from FIG. 6, the ratio step H is no longer in a second gear plane II and the ratio step G is disposed in a third gear plane III. Here, the ring gear HO3 of the planetary gear set 17 can now be coupled to the input shaft EW1 in a rotationally fixed manner by means of the shift element S10, while the planet carrier ST3, as before, can be fixed to the transmission housing 10 via the shift element S12. Additionally, the spur gear Z17 of the ratio step G can now be coupled to the input shaft EW2 in a rotationally fixed manner via the shift element S11. Apart from that, the stepped transmission 19 from FIG. 9 corresponds to the stepped transmission 18 from FIG. 8.

FIG. 10 shows an example shift pattern that can be implemented in each case using the two stepped transmissions 18 and 19. Here, a total of twelve forward gears and one reverse gear can be shifted to, wherein between the forward gears, a change of the transmission ratio under load is possible with the exception of a gear change between the sixth and seventh forward gear. This is possible, as already the case with the shift pattern according to FIG. 7, due to a respective change between the partial transmissions.

Here, a first forward gear can be shifted to by engaging the load shifting element K2 and actuating the shift elements S13, S15 and S7, whereas a second forward gear results by transferring the load shifting element K1 into an actuated state and actuating the shift elements S10, S15 and S7. Additionally, a third forward gear can be shifted to in that the load shifting element K2 is engaged and the shift elements S11, S15 and S7 are actuated, wherein a fourth forward gear can be implemented by engaging the load shifting element K1 and actuating the shift elements S9, S15 and S7. In addition, a fifth forward gear is defined by engaging the load shifting element K2 and actuating the shift elements S14 and S7. A sixth forward gear results by engaging the load shifting element K1 and actuating the shift elements S10, S11, S14 and S7, wherein, for implementing a seventh forward gear, the load shifting element K2 is actuated and the shift elements S13, S15 and S8 are actuated. Then, for shifting to an eighth forward gear, the load shifting element K1 is engaged and the shift elements S10, S15 and S8 are actuated. Additionally, a ninth forward gear can be represented in that the load shifting element K2 is transferred into an actuated state and the shift elements S11, S15 and S8 are actuated, whereas in a tenth forward gear the load shifting element K1 is engaged and the shift elements S9, S15 and S8 are actuated. Finally, an eleventh forward gear results from actuating the load shifting element K2 and the shift elements S14 and S8, whereas for a twelfth forward gear the load shifting element K1 is engaged and the shift element S10, S11, S14 and S8 are actuated. In contrast, a reverse gear of the stepped transmission 18 and also the stepped transmission 19 are implemented by engaging the load shifting element K2 and actuating the shift elements S12, S15 and S7.

Figure 11:
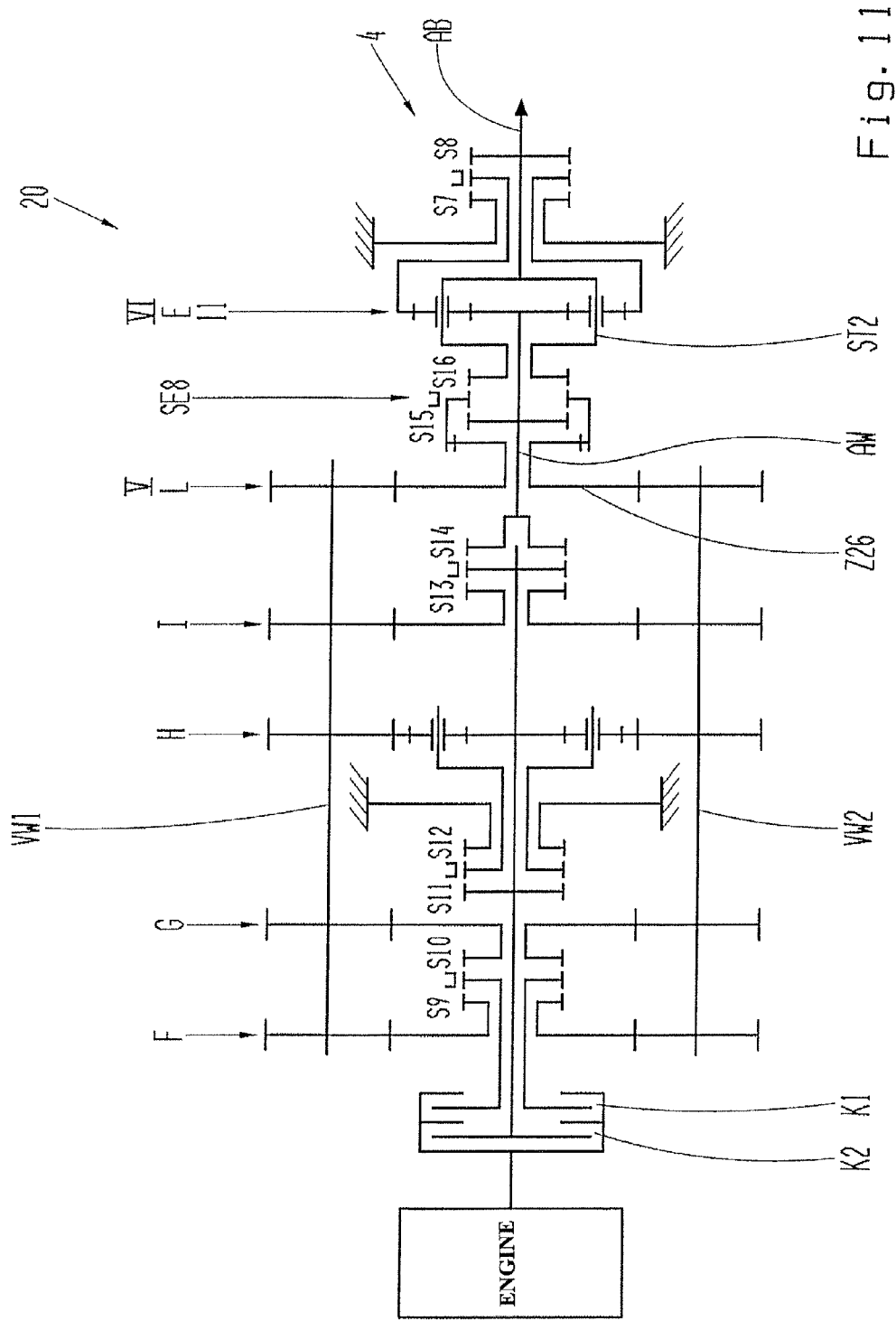
FIG. 11 a schematic view of a stepped transmission according to a seventh preferred embodiment.

FIG. 11 shows a seventh preferred embodiment of a stepped transmission 20, wherein this stepped transmission 20 corresponds largely to the stepped transmission 18 from FIG. 8. In contrast to the stepped transmission 18 from FIG. 8, the spur gear Z26 of the ratio step L located in the fifth gear plane V, along with the ability to be coupled to the output shaft AW in a rotationally fixed manner by means of the shift element S15, can also be connected to the carrier ST2 of the ratio step E in a rotationally fixed manner, using a shift element S16. Thus, the spur gear Z26 can either be connected in a rotationally fixed manner to the output shaft AW, or can be coupled in a rotationally fixed manner to the planet carrier ST2 of the planetary gear set 11 connected to the output side AB. Thus, using the ratio step L, rotational movements of the two countershafts VW1 and VW2 can be transmitted to the centrally running output shaft AW, wherein rotational movement of the output shaft AW is then, in further progression, transmitted to the output side AB by means of the downstream ratio step E. However, a direct transmission of rotational movements of the countershafts VW1 and VW2 to the output side AB can be performed without the power flow being guided via the output shaft AW. As a consequence, despite the downstream range group 4 in the form of the ratio step E, the stepped transmission 20 also attains the ability for full load shifting because, between two range transmissions implemented using the range group 4, a direct coupling of the output side AB to the countershafts VW1 and VW2 can be performed by means of the ratio step L. The shift element S15 and the shift element S16 can here be combined to a shift device SE8, which is implemented as a double synchronization, and has a shift collar, which can be moved from a neutral position either into a shift position actuating the shift element S15 or into a shift position actuating the shift element S16.

Figure 12:
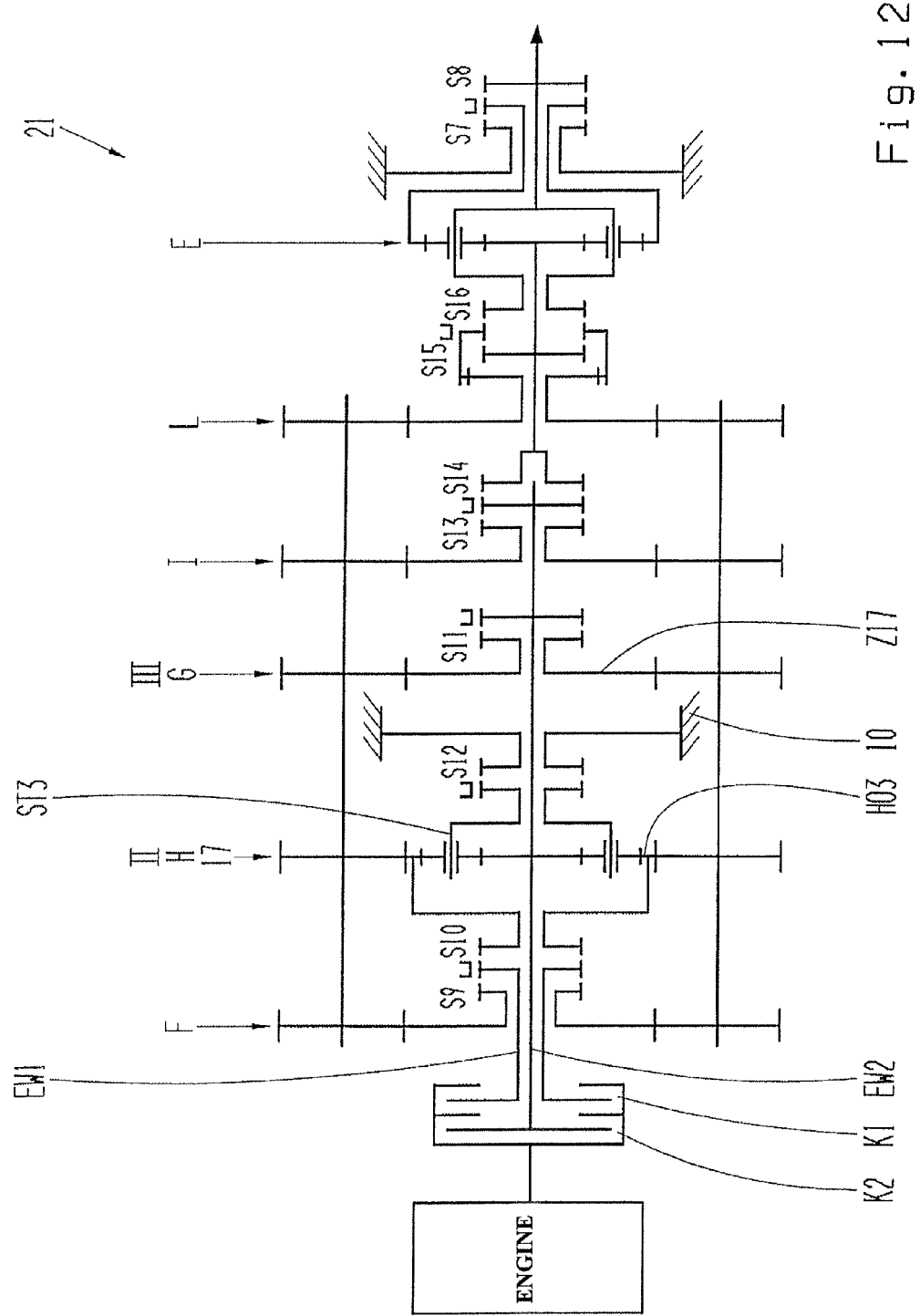
FIG. 12 a schematic representation of a stepped transmission according to an eighth embodiment possibility of the invention.

FIG. 12 shows a further, eighth embodiment of a stepped transmission 21, which corresponds largely to the stepped transmission 20 of the prior variant. Here, the stepped transmission 21 in the embodiment thereof deviates from the stepped transmission 20 from FIG. 11 in that, as already in the case of the stepped transmission 19 from FIG. 9, the ratio step H is provided in a second gear plane II and the ratio step G is provided in a third gear plane III. Again, in doing so, the ring gear HO3 of the planetary gear set 17 of the ratio step H can be coupled to the input shaft EW1 in a rotationally fixed manner by means of the shift element S10, while the planet carrier ST3 can be fixed to the transmission housing 10 via the shift element S12. With respect to the ratio step G, the spur gear Z17 can be connected to the input shaft EW2, implemented as a transmission central shaft in a rotationally fixed manner, by means of the shift element S11. Otherwise, the stepped transmission 21 corresponds to the stepped transmission 20 from FIG. 11.

FIG. 13 highlights an example shift pattern that can be implemented both by the stepped transmission 20 from FIG. 11 as well as by the stepped transmission 21 from FIG. 12. Here, a total of ten forward gears and a reverse gear can be implemented, wherein the forward gears can be shifted under load, in that during driving in a gear of the one partial transmission, a subsequently successive gear is already preselected in the respective other partial transmission of the stepped transmission 20 or 21. A shift between the gears occurs then by only shifting between the load shifting elements K1 and K2.

A first forward gear results here in that the load shifting element K2 is engaged and additionally the shift elements S13, S15 and S7 are actuated, whereas a second forward gear can be implemented by engaging the load shifting element K1 and actuating the shift elements S10, S15 and S7. A third forward gear can then be shifted to in that the load shifting element K2 is engaged and the shift elements S11, S15 and S7 are actuated, whereas a fourth forward gear can be implemented by means of engaging the load shifting element K1 and actuating the shift elements S9, S15 and S7. Additionally, a fifth forward gear results in that the load shifting element K2 is engaged and the shift elements S14 and S7 are actuated. A sixth forward gear is then implemented by engaging the load shifting element K1, and actuating the shift elements S10 and S16, whereas, for shifting into a seventh forward gear, the load shifting element K2 is engaged and the shift elements S11 and S16 are actuated. Then, for shifting into an eighth forward gear, the load shifting element K1 and the shift elements S9 and S16 are transferred into an actuated state, whereas for a ninth forward gear the load shifting element K2 and the shift elements S14 and S8 are actuated. The shift element S8 is actuated either already in the seventh gear or at the latest in the eighth forward gear such that a change from the eighth forward gear into the ninth forward gear can be performed under full load. Finally, a tenth forward gear results in that the load shifting element K1 is engaged and the shift elements S9, S11, S14 and S8 are actuated. In contrast, the reverse gear is implemented by engaging the load shifting element K2, and actuating the shift elements S12, S15 and S7.

In addition, FIG. 14 shows a further example shifting pattern which can be implemented both by the stepped transmission 20 from FIG. 11 as well as by the stepped transmission 21 from FIG. 12. In contrast to the shift pattern according to FIG. 13, here eleven forward gears and one reverse gear can be shifted, wherein in each case shifting between the eleven forward gears can occur under load. Here again, the shifting under load can be implemented by preselecting the appropriate shift elements S7 to S16 of the respective gear and a subsequent change between the load shifting elements K1 and K2.

Here, a first forward gear results in that the load shifting element K2 is engaged and the shift elements S13, S15 and S7 are actuated, whereas a second forward gear can be shifted to by engaging the load shifting element K1 and actuating the shift elements 310, S15 and S7. Following this, a third forward gear is implemented by engaging the load shifting element K2 and actuating the shift elements S11, S15 and S7, whereas a fourth forward gear is implemented by engaging the load shifting element K1 and transferring the shift elements S9, S15 and S7 in each case into an actuated state. In addition, a fifth forward gear is shifted to in that the load shifting element K2 is engaged and the shift elements S14 and S7 are actuated, wherein, for shifting into the sixth forward gear, the load shifting element K2 is engaged again and the shift elements S13 and S16 are actuated. A seventh forward gear results in that the load shifting element K1 is engaged and the shift elements S10 and S16 are actuated, whereas following this an eighth forward gear is shifted to by actuating the load shifting element K2 and actuating the shift elements S11 and S16. Following this, a ninth forward gear is implemented in that the load shifting element K1 is engaged and the shift elements S9 and S16 are transferred into an actuated state. In addition, the shift element S8 is actuated already either with the eighth forward gear, or however at the latest, with the ninth forward gear, so that a gear change from the ninth forward gear into a tenth forward gear can be performed without interruption of tractive force, in that the shifting into the downstream range group 4 is already performed in the eighth forward gear or in the ninth forward gear. The tenth forward gear results then in that the load shifting element K2 is engaged and the shift elements S14 and S8 are actuated, whereas a last, the eleventh forward gear can be shifted to by engaging the load shifting element K1 and actuating the shift elements S9, S11, S14 and S8. The one reverse gear results in that the load shifting element K2 is engaged and the shift elements S12, S15 and S7 are actuated.

Figure 15:
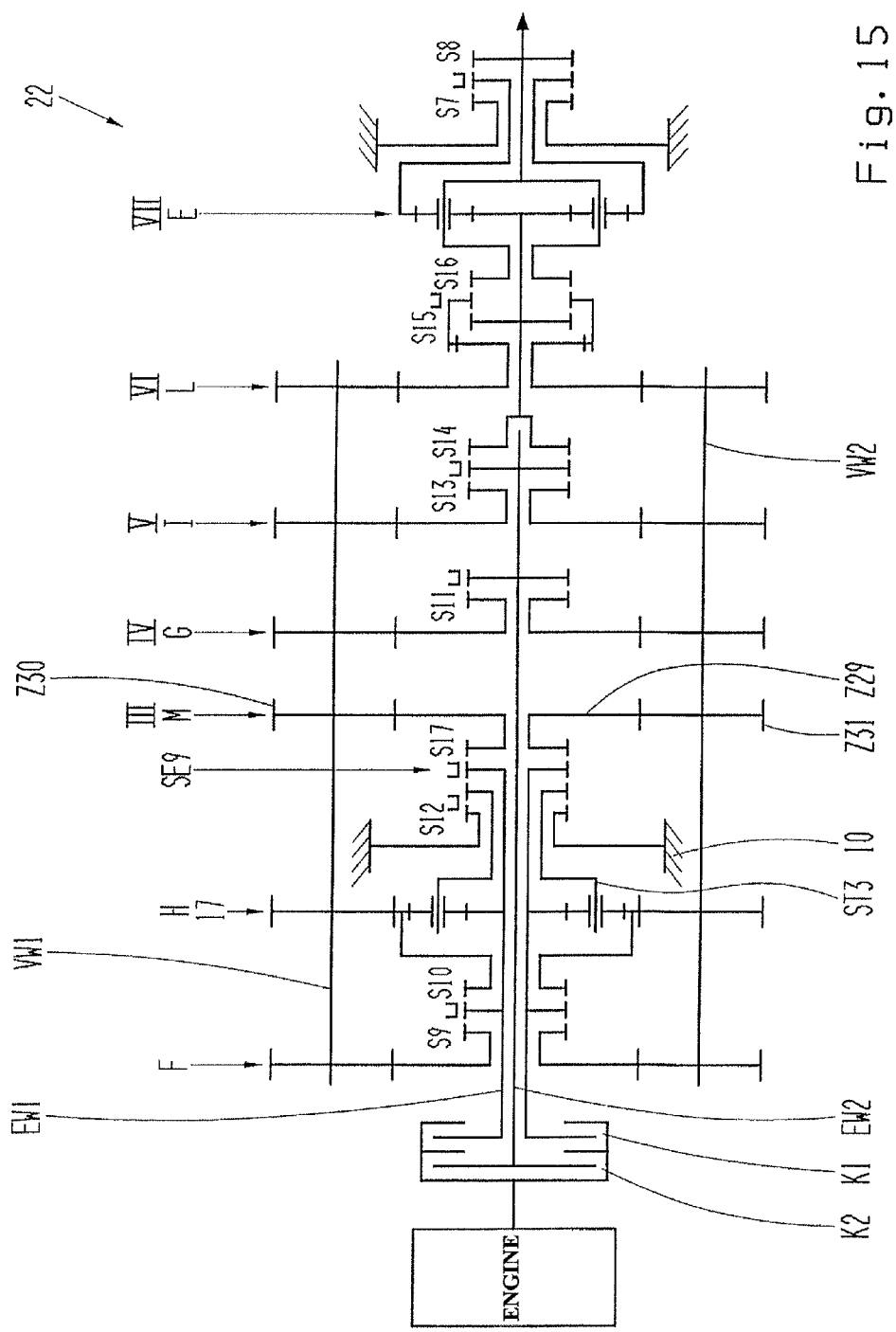
FIG. 15 a schematic representation of a stepped transmission according to a ninth embodiment of the invention.

In addition, FIG. 15 shows a ninth embodiment of a stepped transmission 22, which largely corresponds to the stepped transmission 21 from FIG. 12. However, the stepped transmission 22 differs from the prior variant in that a ratio step M is present in a third gear plane III of the stepped transmission 22, whereas the ratio step G is disposed in a fourth gear plane IV, the ratio step I is disposed in a fifth gear plane V, the ratio step L is disposed in a sixth gear plane VI and the ratio step E is disposed in a seventh gear plane VII. A spur gear Z29 of the ratio step M is rotatably mounted on the input shaft EW2, and meshes with a spur gear Z30 provided on the countershaft VW1 in a rotationally fixed manner and with a spur gear Z31 placed on the countershaft VW2 in a rotationally fixed manner. Additionally, the spur gear Z29 can be connected to the input shaft EW1 in a rotationally fixed manner via a shift element S17, so that consequently rotational movement of the input shaft EW1 is transmitted to the two countershafts VW1 and VW2 via the ratio step M. Using the shift element S12, which is directly adjacent to the shift element 517, the planet carrier ST3 of the planetary gear set 17 can be fixed to the transmission housing 10. Here, the shift element S12 and the shift element S17 are combined into a shift device SE9, which has two shift collars, wherein these two shift collars can be moved using a common actuator, and in doing so, with movement in the one sliding direction, the shift element S12 is actuated, whereas with movement in the opposing sliding direction, the shift element S17 is actuated.

Apart from that, the stepped transmission 22 from FIG. 15 corresponds to the stepped transmission 21 from FIG. 12.

FIG. 16 now shows an example shift pattern which can be implemented using the stepped transmission 22 from FIG. 15. As seen here, a total of thirteen forward gears and two reverse gears can be shifted to, wherein a gear change between the thirteen forward gears can be performed under load by always alternating back and forth between the two partial transmissions via the respectively associated load shifting elements K1 and K2.

Here, a first forward gear can be shifted to in that the load shifting element K1 is engaged and the shift elements S9, S15 and S7 are actuated, whereas a second forward gear results from engaging the load shifting element K2 and actuating the shift elements S13, S15 and S7. A further, third forward gear can be implemented in that the load shifting element K1 is engaged and the shift elements S17, S15 and S7 are transferred into an actuated state. Additionally, a fourth forward gear results from engaging the load shifting element K2 and actuating the shift elements S11, S15 and S7; a fifth forward gear results from engaging the load shifting element K1 and actuating the shift elements S10, S15 and S7. In addition, a sixth forward gear is shifted to in that the load shifting element K2 is actuated and the shift elements S14 and S7 are actuated. A further, seventh forward gear results in that the load shifting element K1 is engaged and the shift elements S9 and S16 are actuated, while an eighth forward gear can be implemented by actuating the load shifting element K2 and the shift elements S13 and S16. A ninth forward gear is defined by engaging the load shifting element K1 and actuating the shift elements S17 and S16, whereas a tenth forward gear can be shifted to by actuating the load shifting element K2 and the shift elements S11 and S16. Following this, an eleventh forward gear results in that the load shifting element K1 is engaged and the shift elements S10 and S16 are actuated. Finally, a twelfth forward gear is implemented by engaging the load shifting element K2 and actuating the shift elements S14 and S8, whereas a last, thirteenth forward gear is shifted to by actuating the load shifting element K1 and actuating the shift element S10, S11, S14 and S8. With both reverse gears, in each case, the load shifting element K2 is engaged, wherein with a first reverse gear, the shift elements S12, S15 and S7 are then additionally actuated, and with a second reverse gear, the shift element S12 and S16.

Figure 17:
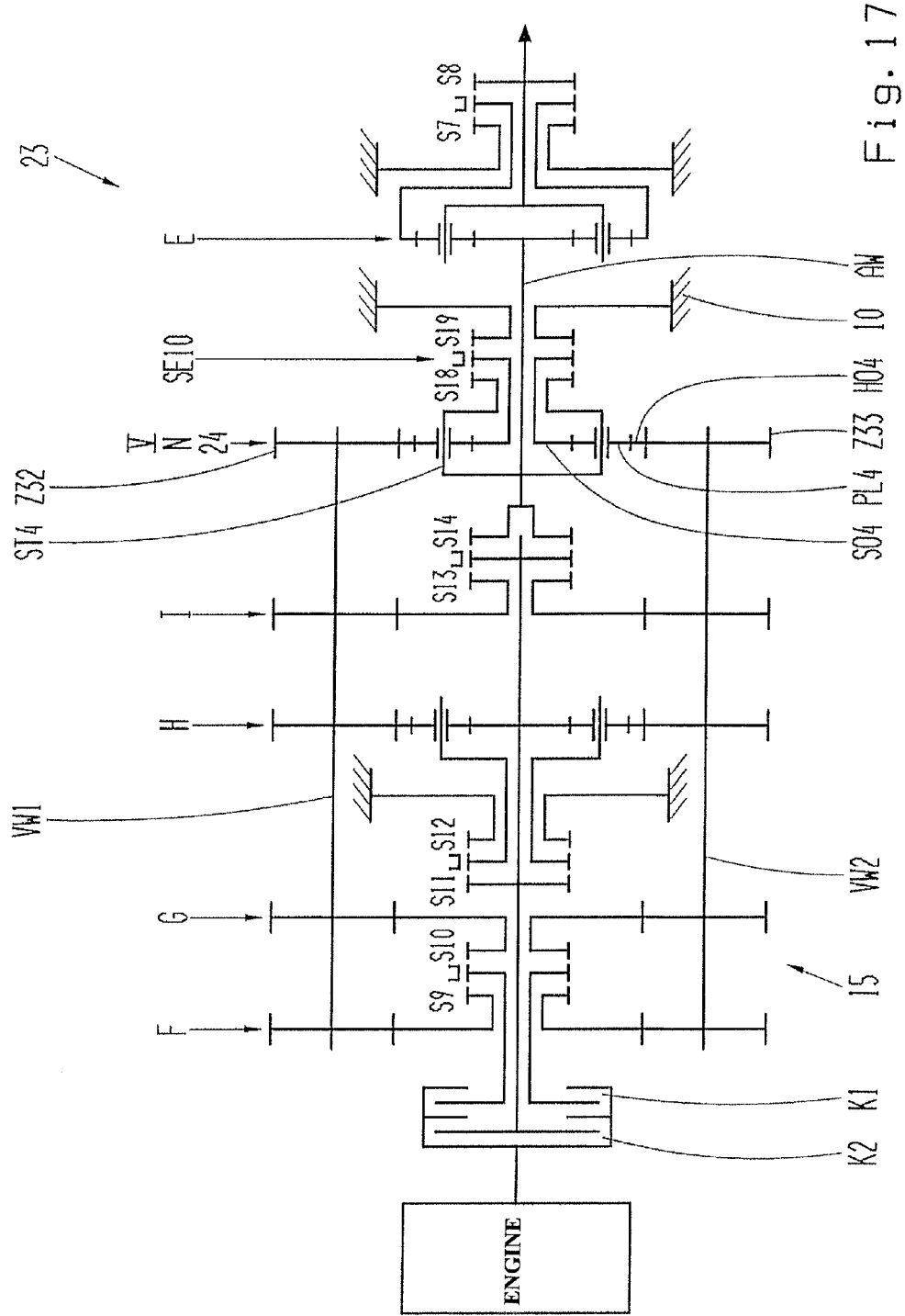
FIG. 17 a schematic view of a tenth preferred embodiment of a stepped transmission.

FIG. 17 shows a stepped transmission 23 according to a tenth possible embodiment of the invention. This stepped transmission 23 corresponds largely to the stepped transmission 18 shown in FIG. 8, wherein, in contrast to the stepped transmission 18, in a fifth gear plane V, there is a ratio step N which is implemented according to the invention as a nested ratio step. Here, the ratio step N comprises a planetary gear set 24 which, in interplay with a spur gear Z32 provided on the countershaft VW1 in a rotationally fixed manner and a spur gear Z33 disposed on the countershaft VW2 in a rotationally fixed manner, forms the nesting of ratio step N. Here, a planet carrier ST4 of the planetary gear set 24 is connected to the output shaft AW in a rotationally fixed manner and guides the planetary gears PL4, which are engagement with a sun gear SO4 and with a ring gear HO4 of the planetary gear set 24. The ring gear HO4 is additionally provided with outer teeth by means of which the ring gear HO4 is also in engagement with the spur gear Z32 and with the spur gear Z33.

Additionally, a sun gear SO4 of the planetary gear set 24 is mounted rotatably on the output shaft AW and can be coupled to the planet carrier ST4 in a rotationally fixed manner using the shift element S18 and can be fixed to the transmission housing 10 using a shift element S19. As a result, two different ratio steps can be implemented on the output shaft AW by rotational movements of the countershafts VW1 and VW2, in that, with actuation of the shift element S18, the sun gear SO4 rotates as one with the planet carrier ST4 and defines a first transmission ratio, while with actuating the shift element S19, the sun gear SO4 is stationary and as a consequence results in slower rotational movement of the planet carrier ST4 due to compensation movements of the planetary gears PL4. Here, corresponding crawler gears of the main group 15 can be defined by actuating the shift element S19. As seen in FIG. 17, the shift element S18 and the shift element S19 are combined to a shift device SE10, and accordingly have a common shift collar, which, with movement out of the neutral position, actuates either the shift element S18 or the shift element S19. Apart from that, the stepped transmission 23 corresponds to the stepped transmission 18 from FIG. 8.

Additionally, FIG. 18 also shows an example shift pattern of the stepped transmission 23 from FIG. 17. As can be seen, a total of twelve forward gears, two reverse gears and four crawler gears can be shifted to. With the exception of a gear change between the sixth and seventh forward gear, in each case the forward gears and also the crawler gears can be shifted under load so that it is possible to change gears without an interruption of tractive force.

A first forward gear is now shifted to in that the load shifting element K2 is engaged and the shift elements S13, S18 and S7 are actuated, while a second forward gear can be implemented by actuating the load shifting element K1 and actuating the shift elements S10, S18 and S7. Additionally a third forward gear results in that the load shifting element K2 is engaged and the shift elements S11, S18 and S7 are actuated, whereas a further, fourth forward gear can be shifted to by actuating the load shifting element K1 and the shift elements S9, S18 and S7. A fifth forward gear can be implemented by engaging the load shifting element K2 and actuating the shift element S14 and shift element S7, wherein a sixth forward gear is defined by the load shifting element K1 and interplay with shift elements S10, S11, S14 and S7. In addition, a seventh forward gear results in that the load shifting element K2 is engaged and the shift elements S13, S18 and S8 are actuated, while an eighth forward gear is defined with actuation of the load shifting element K1 and shift elements S10, S18 and S8. A further, ninth forward gear can be shifted to by engaging the load shifting element K2 and actuating the shift element S11, S18 and S8, while, following this, a tenth forward gear is implemented by means of actuating the load shifting element K1 and the shift elements S9, S18 and S8. Lastly, an eleventh forward gear and a twelfth forward gear can be shifted to, wherein the eleventh forward gear is implemented by actuating the load shifting element K2 and the shift elements S14 and S8, whereas, in the case of the twelfth forward gear, the load shifting element K1 is actuated and the shift elements S10, S11, S14 and S8 are actuated.

In contrast, a first crawler gear can be shifted to in that the load shifting element K2 is engaged and the shift element S13, S19 and S7 are actuated. A further, second crawler gear can be implemented by actuating the load shifting element K1 and the shift elements S10, S19 and S7, whereas a third crawler gear can be shifted to by means of actuating the load shifting element K2 and the shift elements S11, S19 and S7. Finally, a fourth crawler gear results in that the load shifting element K1 is engaged and the shift elements S9, S19 and S7 are actuated. The two reverse gears are each shifted to by engaging the load shifting element K2, where, in the case of the first reverse gear, additionally the shift elements S12, S19 and S7 are actuated, and for the second reverse gear the shift elements S12, S18 and S7 are actuated.

Figure 19:
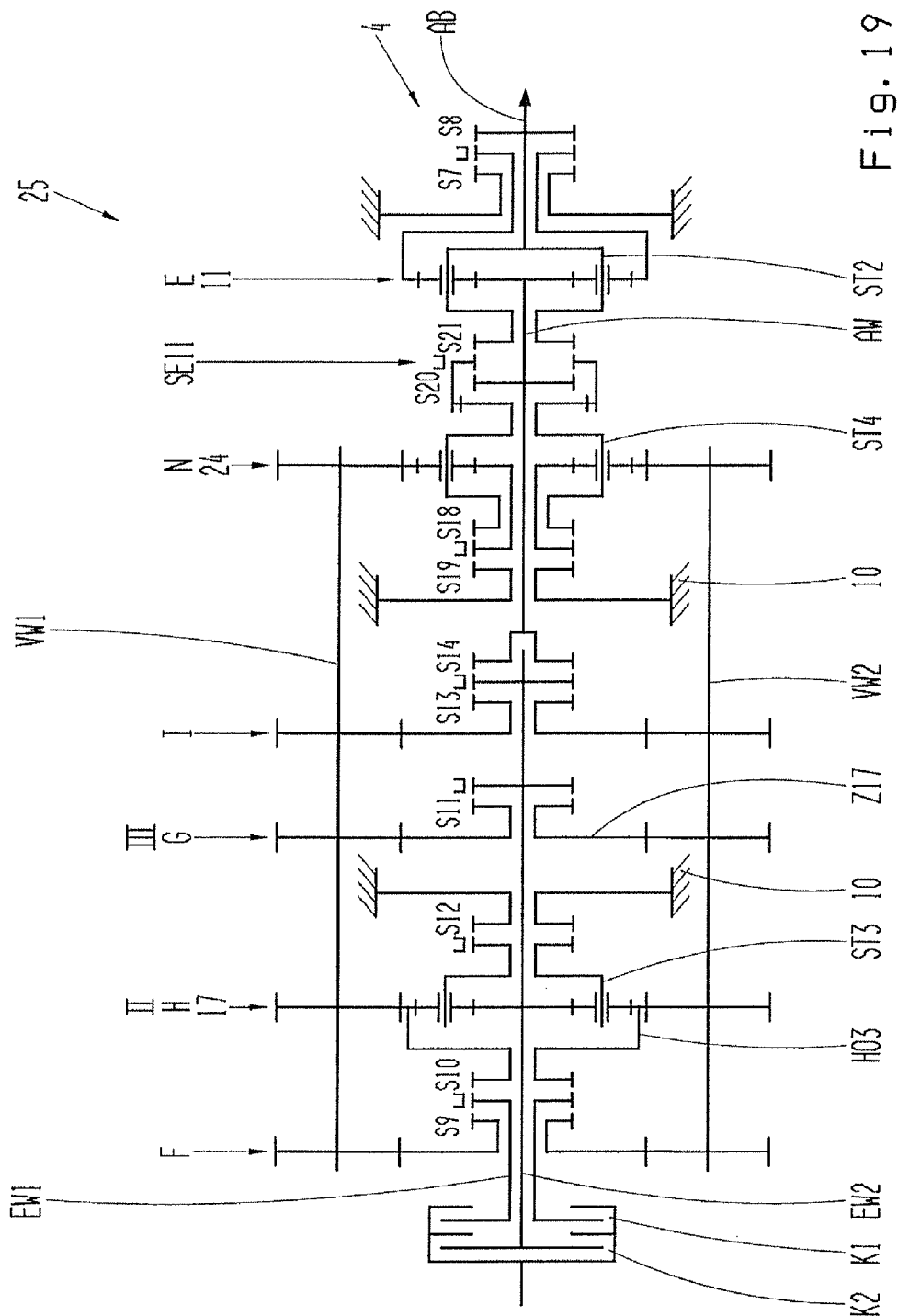
FIG. 19 a schematic view of a stepped transmission according to an eleventh preferred embodiment of the invention.

Finally, FIG. 19 shows an eleventh possible embodiment of a stepped transmission 25. This corresponds largely to the stepped transmission 23 from FIG. 17, wherein here, the stepped transmission 25 differs from the stepped transmission 23 in that, as with the stepped transmissions 19 and 21, the ratio step G is provided in a third gear plane III, whereas the nested ratio step H is placed in a second gear plane II of the stepped transmission 25. Accordingly, a ring gear HO3 of the planetary gear set 17 can also be connected to the input shaft EW1 in a rotationally fixed manner, again by means of the shift element S10, whereas the planet carrier ST3 of the planetary gear set 17 can be fixed to the transmission housing 10 by means of the shift element S12. Regarding the ratio step G, the spur gear Z17 can now be coupled to the input shaft EW2 in a rotationally fixed manner using the shift element S11.

Additionally, as a further difference, the planet carrier ST4 of the planetary gear set 24 is not permanently coupled to the output shaft AW, but rather can either be connected to the output shaft AW in a rotationally fixed manner using a shift element S20, or can be coupled to the planet carrier ST2 of the planetary gear set 11 in a rotationally fixed manner using a shift element S21. Thus, according to this, using the ratio step N, it is possible to transmit rotational movement of the countershafts VW1 and VW2 to the output side AB either in interplay with the downstream range group 4, or the downstream range group 4 is bypassed. Here, the shift element S20 and the shift element S21 are combined in a shift device SE11, the shift collar of which, with movement out of the neutral position, actuates either the shift element S20 or the shift element S21.

FIG. 20 shows an example shift pattern that can be implemented using the stepped transmission 25 from FIG. 19. Here, a total of ten forward gears, two reverse gears and four crawler gears can be shifted, wherein a gear change between the forward gears and the crawler gears can be shifted to without interruption of tractive force.

Here, a first forward gear results in that the load shifting element K2 is engaged and the shift elements S13, S18, S20 and S7 are actuated, while a further, second forward gear can be implemented by engaging the load shifting element K1 and actuating the shift elements S10, S18, S20 and S7. Additionally, a third forward gear is defined in that the load shifting element K2 is engaged and the shift elements S11, S18, S20 and S7 are actuated, whereas, for implementing a fourth forward gear, the load shifting element K1 and also the shift elements S9, S18, S20 and S7 are transferred to an actuated state. A fifth forward gear is shifted to by actuating the load shifting element K2 and the shift elements S14, S18 and S7, whereas a sixth forward gear can be implemented by engaging the load shifting element K1 and actuating the shift elements S10, S18 and S21. Additionally, a seventh forward gear results in that the load shifting element K2 is engaged and the shift elements S11, S18 and S21 are actuated, whereas a further, eighth forward gear can be shifted to using the load shifting element K1 in interplay with the shift elements S9, S18 and S21. Here, in order to perform a gear change from the eighth forward gear into a ninth forward gear under load, the shift element S8 is actuated, either already in the seventh forward gear or, however, at the latest in the eighth forward gear. The ninth forward gear is implemented then by engaging the load shifting element K2 and the shift elements S14, S18 and S8, whereas a last, tenth forward gear results from engaging the load shifting element K1 and actuating the shift elements S9, S11, S14, S18 and S8.

In contrast, a first crawler gear can be implemented by engaging the load shifting element K2 and actuating the shift elements S13, S19, S20 and S7, while a following, second crawler gear can be shifted to by actuating the load shifting element K1 and the shift elements S10, S19, S20 and S7. A third crawler gear is shifted to by engaging the load shifting element K2 and actuating the shift elements S11, S19, S20 and S7, whereas a fourth crawler gear results from actuating the load shifting element K1 and the shift elements S9, S19, S20 and S7. Finally, both reverse gears can each be implemented by actuating the load shifting element K2, wherein for a first reverse gear the shift elements S12, S19, S20 and S7 are also actuated, whereas in the case of a second reverse gear the shift elements S12, S18, S20 and S7 are actuated.

By using at least one nested ratio step A, H and N with the stepped transmission according to the invention 1, 12, 13, 14, 18, 19, 20, 21, 22, 23 and 25, these stepped transmissions can be built compactly in the axial direction and be able to implement a large number of gears.

REFERENCE CHARACTERS 1 stepped transmission
2 main group
3 splitter group
4 range group
5 internal combustion engine
6 main shaft axis
7 countershaft axis
8 countershaft axis
9 planetary gear set
10 transmission housing
11 planetary set
12 stepped transmission
13 stepped transmission
14 stepped transmission
15 main group
16 double clutch
17 planetary gear set
18 stepped transmission
19 stepped transmission
20 stepped transmission
21 stepped transmission
22 stepped transmission
23 stepped transmission
24 planetary gear set
25 stepped transmission
I first gear plane
II second gear plane
III third gear plane
IV fourth gear plane
V fifth gear plane
VI sixth gear plane
VII seventh gear plane
AN drive side
AB output side
EW input shaft
EW1 input shaft
EW2 input shaft
AW output shaft
VW1 countershaft
VW2 countershaft
Z1 to Z33 spur gears
S1 to S21 shift elements
SE1 to SE11 shift devices
K load shift element
K1 load shift element
K2 load shift element
A ratio step
B ratio step
C ratio step
D ratio step
E ratio step
F ratio step
G ratio step
H ratio step
I ratio step
J ratio step
L ratio step
M ratio step
N ratio step
SO1 sun gear
HO1 ring gear
PL1 planetary gears
ST1 planet carrier
SO2 sun gear
HO2 ring gear
PL2 planetary gears
ST2 planet carrier
SO3 sun gear
HO3 ring gear
PL3 planetary gears
ST3 planet carrier
SO4 sun gear
HO4 ring gear
PL4 planetary gears
ST4 planet carrier

The invention claimed is:

1. A stepped transmission with a selectable ratio step comprising at least two transmission shafts extending parallel to one another, a first of the at least two transmission shafts comprising a main shaft defining a first axis while a second of the at least two transmission shafts defining a second axis, and the at least two transmission shafts being couplable to one another via the selectable ratio step,
an upstream planetary gear set being provided coaxial with the first axis, the upstream planetary gear set comprising first, second and third transmission components,
the first transmission component being connected to and driven by drive supplied along the first axis,
the second transmission component having an external gearing which directly meshes with an external gearing of at least one spur gear located on the second axis,
a first shift element facilitating braking of the third transmission component to a transmission housing for implementing a first transmission ratio,
one of the third transmission component or the second transmission component being connectable, by at least a second shift element, to the drive supplied along the first axis for implementing a second transmission ratio, and
wherein the second transmission component is a ring gear which is connected, via an internal gearing, to the first and the third transmission components of the upstream planetary gear set.

2. The stepped transmission with the selectable ratio step according to claim 1, wherein the first transmission component is a sun gear which is connected to the ring gear and a planet carrier, supporting planetary gears, is the third transmission component.

3. The stepped transmission with the selectable ratio step according to claim 1, wherein the first transmission component is a planet carrier of the upstream planetary gear set which guides planetary gears which mesh with both a sun gear, which forms the third transmission component, as well as with the ring gear.

4. The stepped transmission with the selectable ratio step according to claim 1, further comprising:
   a third transmission shaft in addition to the at least two transmission shafts, the third transmission shaft comprising a countershaft defining a third axis which extends parallel to the first and second axes;
   a second spur gear, wherein the second transmission component of the upstream planetary gear set engages with the two spur gears which each are provided on a respective one of the second and third axes.

5. A stepped transmission, for a motor vehicle transmission, comprising at least two transmission shafts extending parallel to one another, a first of the at least two transmission shafts comprising a main shaft defining a first axis while a second of the at least two transmission shafts defines a second axis, and the at least two transmission shafts being couplable to one another using at least a first ratio step,
   the at least first ratio step further comprising:
      an upstream planetary gear set being provided coaxial with the first axis, the upstream planetary gear set comprising first, second and third transmission components,
      the first transmission component being connected to and driven by drive supplied along the first axis,
      the second transmission component engaging with at least one spur gear located on the second axis,
      a first shift element facilitating braking of the third transmission component of the upstream planetary gear set to a transmission housing for implementing a first transmission ratio,
      one of the third transmission component or the second transmission component being connectable, by a second shift element, to the drive supplied along the first axis for implementing a second transmission ratio, and
      the at least first ratio step being implemented as a nested ratio step with the upstream planetary gear set and the at least one spur gear both lying in a common gear plane.

6. The stepped transmission according to claim 5, wherein the main shaft is an input shaft;
   the second of the at least two transmission shafts, which is a countershaft, is connectable to the input shaft by the at least first ratio step;
   the first ratio step being implemented in a nested manner by the upstream planetary gear set and the at least one spur gear which both lie in a common gear plane;
   the second transmission component is a ring gear of the upstream planetary gear set which is connected, via an internal gearing, to at least one of the first and the third transmission components of the upstream planetary gear set; and the ring gear meshes, via an external gearing, with the at least one spur gear;
   the first transmission component is a sun gear which is connected to the ring gear by interposed planetary gears of a planet carrier which forms the third transmission component,
   the first ratio step comprises:
      the sun gear which is located on the input shaft in a rotationally fixed manner and at least one spur gear, which is located on the countershaft in a rotationally fixed manner;
      the planet carrier is engageable with the transmission housing by engagement of the first shift element, and either the planet carrier or the ring gear is connectable to the input shaft in a rotationally fixed manner;
   a second ratio step comprises a second spur gear, the second spur gear is rotatably mounted coaxial with the input shaft and meshes with a third spur gear supported on the countershaft in a rotationally fixed manner;
   the second spur gear is fixable both to the input shaft and to a third transmission shaft which is an output shaft extending coaxial to the input shaft, such that the input shaft and the output shaft are each couplable to the countershaft; the output shaft and the input shaft are couplable to one another;
   the output shaft is couplable to the countershaft using a third ratio step; and
   the output shaft is couplable to either the input shaft or the output shaft by a fourth ratio step.

7. The stepped transmission according to claim 5, wherein the main shaft is a first input shaft, the first input shaft being disposed coaxial to a third transmission shaft comprising a second input shaft, such that first and second input shafts both extend along the first axis;
   each of the first and the second input shafts is alternatingly connectable into a power flow to the drive supplied along the first axis via a connection of the respectively assigned first and second input shafts,
   the first input shaft is implemented as a transmission hollow shaft and the second input shaft is implemented as a transmission central shaft;
   at least two countershaft axes are provided, parallel to the main shaft axis, each with a countershaft with which the first input shaft is couplable, via the at least first ratio step, and with which the second input shaft is couplable, via a second ratio step, and
   an output shaft is provided coaxial with the first and the second input shafts that is connectable in a rotationally fixed manner to the second input shaft.

8. The stepped transmission according to claim 7, wherein the first input shaft, via a third ratio step, and the second input shaft, via a fourth ratio step, can be coupled to each countershaft,
   the fourth ratio step is implemented as a nested manner with the upstream planetary gear set and the at least one spur gear both lying in a common gear plane in which a ring gear which is connected, via an internal gearing, to the first and the third transmission components of the upstream planetary gear set and the ring gear meshes, via an external gearing, with the at least one spur gear, the first transmission component is a sun gear which is connected to the ring gear by an interposed planetary gears of a planet carrier which forms the third transmission component,
   the at least one spur gear which is disposed on each of the countershafts in a rotationally fixed manner, and the sun gear (SO3) of which is disposed on the second input shaft in a rotationally fixed manner, and
   the planet carrier, of the fourth ratio step, is connectable in a rotationally fixed manner to the second input shaft and is fixable to the transmission housing.

9. The stepped transmission according to claim 7, wherein the second input shaft is connectable to the countershafts via a third ratio step, and the first input shaft or the second input shaft is couplable to the countershafts via a fourth ratio step, the fourth ratio step is implemented in a nested manner with the upstream planetary gear set and the at least one spur gear both lying in a common gear plane in which a ring gear which is connected, via an internal gearing, to the first and the third transmission components of the upstream planetary gear set and the ring gear meshes, via an external gearing, with the at least one spur gear, the first transmission component is a sun gear which is connected to the ring gear by an interposed planetary gears of a planet carrier which forms the third transmission component, at least one spur gear is disposed on each of the countershafts in a rotationally fixed manner and the sun gear is disposed on the second input shaft in a rotationally fixed manner, the ring gear, of the fourth ratio step, is connectable to the first input shaft in a rotationally fixed manner, and the planet carrier, of the fourth ratio step, is fixable to a transmission housing.

10. The stepped transmission according to claim 8, wherein the output shaft is coupled to each of the countershafts via a fifth ratio step.

11. The stepped transmission according to claim 8, wherein the output shaft is couplable to each of the countershafts via a fifth ratio step.

12. The stepped transmission according to claim 11, wherein the at least first ratio step is implemented in a nested manner with the upstream planetary gear set and the at least one spur gear both lying in a common gear plane in which a ring gear which is connected, via an internal gearing, to the first and the third transmission components of the upstream planetary gear set (9; 17; 24) and the ring gear meshes, via an external gearing, with the at least one spur gear, the first transmission component is a sun gear which is connected to a ring gear by an interposed planetary gears of a planet carrier which forms the third transmission component, the at least one spur gear is provided on one of the countershafts in a rotationally fixed manner, the sun gear, of the fifth ratio step, is fixable to the transmission housing (10) and is couplable to the planet carrier of the fifth ratio step, which is either connected to the output shaft in a rotationally fixed manner, or is couplable to the output shaft and to the output side.

13. The stepped transmission according to claim 6, wherein the output shaft is connectable to the output side using a downstream planetary gear set, the output shaft supports the sun gear of the downstream planetary gear set, and the planet carrier of the downstream planetary gear set is connected to the output side, and the sun gear of the downstream planetary gear set is connected to the ring gear using interposed planetary gears supported by the planet carrier of the downstream planetary gear set, which, for implementing different transmission ratios, is fixable to the transmission housing and to the output side.

14. The stepped transmission according to claim 12, wherein the planet carrier of the fifth ratio step is connectable, in a rotationally fixed manner, to the output shaft and to the planet carrier of a downstream planetary gear set.

15. The stepped transmission according to claim 11, wherein a spur gear of the fifth ratio step, mounted rotatably on the output shaft, is connectable in a rotationally fixed manner to the output shaft and to a planet carrier of a downstream planetary gear set.

16. The stepped transmission according to claim 10, wherein the first input shaft is couplable, via a sixth ratio step, to each of the countershafts.

17. A stepped transmission with the selectable ratio step comprising at least two transmission shafts running along axis extending parallel to each other, the selectable ratio step couples the at least two transmission shafts to each other, an upstream planetary gear set is coaxial with a, first axis and comprises three transmission components, a first transmission component is connectable to and driven by a drive supplied along the first axis, a second transmission component engages at least one spur gear, and each of the at least one spur gear is located on a further axis extending parallel to the first axis, wherein the second transmission component is a ring gear, a first transmission ratio is engageable by braking a third transmission component of the upstream planetary gear set to a transmission housing via engagement of a first shift element, and a second transmission ratio is engageable by connecting one of the third transmission component or the second transmission component to the first transmission component supplied with the drive provided along the first axis.

* * * * *